(12) United States Patent
Wang et al.

(10) Patent No.: US 9,813,297 B2
(45) Date of Patent: Nov. 7, 2017

(54) APPLICATION SCENARIO IDENTIFICATION METHOD, POWER CONSUMPTION MANAGEMENT METHOD, APPARATUS, AND TERMINAL DEVICE

(71) Applicant: Huawei Technologies Co., Ltd., Shenzhen (CN)

(72) Inventors: Wenchao Wang, Shenzhen (CN); Yaocang Jia, Beijing (CN); Jing Zhu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 14/813,304

(22) Filed: Jul. 30, 2015

(65) Prior Publication Data

US 2015/0333964 A1     Nov. 19, 2015

Related U.S. Application Data

(63) Continuation of application No. PCT/CN2014/088793, filed on Oct. 17, 2014.

(30) Foreign Application Priority Data

Mar. 27, 2014   (CN) .......................... 2014 1 0119905

(51) Int. Cl.
*H04L 12/24* (2006.01)
*H04L 12/26* (2006.01)
(Continued)

(52) U.S. Cl.
CPC ........ *H04L 41/0893* (2013.01); *G06F 1/3203* (2013.01); *G06F 9/44* (2013.01);
(Continued)

(58) Field of Classification Search
CPC .. Y02B 60/50; Y02B 60/185; Y02B 60/1292; Y02B 60/165; G06F 1/3203; G06F 9/44;
(Continued)

(56) References Cited

U.S. PATENT DOCUMENTS 6,901,522 B2   5/2005   Buch
7,278,136 B2   10/2007  Moritz et al.
(Continued)

FOREIGN PATENT DOCUMENTS

CN   101067757 A   11/2007
CN   102148805 A   8/2011
(Continued)

OTHER PUBLICATIONS

Wikipedia, "Kernel (computer science)," Apr. 30, 2013, simple.wikipedia.org, https://web.archive.org/web/20130430132727/https://simple.wikipedia.org/wiki/Kernel_(computer_science).*
(Continued)

*Primary Examiner* — Ruolei Zong
(74) *Attorney, Agent, or Firm* — Conley Rose, P.C.

(57) ABSTRACT

A method for identifying an application scenario of a terminal device, where the method includes analyzing an application program running on a terminal device by means of compilation to obtain characteristic data of the application program; and determining, from a scenario characteristic data set according to the characteristic data of the application program, application scenario information corresponding to the characteristic data of the application program, where the scenario characteristic data set includes a correspondence between multiple types of application scenario information and characteristic data of multiple application programs. Because characteristic data of an application program is more likely to be unique in describing a corresponding application scenario, application scenario infor- (Continued)

mation corresponding to the characteristic data of the application program is relatively accurate. Therefore, an application scenario of a terminal device can be relatively accurately identified according to the embodiments of the present disclosure.

18 Claims, 11 Drawing Sheets

(51) Int. Cl.
    *G06F 9/44*     (2006.01)
    *G06F 11/30*    (2006.01)
    *G06F 1/32*     (2006.01)
    G06F 9/445      (2006.01)
    G06F 9/455      (2006.01)

(52) U.S. Cl.
    CPC .............. *G06F 11/30* (2013.01); *H04L 43/04* (2013.01); *G06F 8/71* (2013.01); *G06F 9/44505* (2013.01); *G06F 9/4552* (2013.01); *Y02B 60/185* (2013.01)

(58) Field of Classification Search
    CPC ........ G06F 11/30; G06F 8/71; G06F 9/44505; G06F 9/4552; H04L 41/0893; H04L 43/04; H04L 67/04
    USPC ....................................................... 709/224
    See application file for complete search history.

(56) References Cited

U.S. PATENT DOCUMENTS

| | | | |
|---|---|---|---|
| 7,904,893 | B2 | 3/2011 | Munter et al. |
| 9,098,333 | B1* | 8/2015 | Obrecht ..................... G06F 9/50 |
| 2003/0014742 | A1 | 1/2003 | Seth et al. |
| 2005/0204125 | A1 | 9/2005 | Chin |
| 2011/0040990 | A1* | 2/2011 | Chan ......................... G06F 1/28 713/300 |
| 2011/0154309 | A1 | 6/2011 | Sazegari et al. |
| 2011/0268425 | A1 | 11/2011 | Glen |
| 2012/0084591 | A1 | 4/2012 | Tupman |
| 2013/0055267 | A1* | 2/2013 | Noro ..................... G06F 9/4893 718/100 |
| 2013/0191541 | A1* | 7/2013 | Kishan .................. G06F 9/5011 709/226 |
| 2013/0291111 | A1* | 10/2013 | Zhou ..................... G06F 21/566 726/23 |
| 2013/0311803 | A1 | 11/2013 | Wang et al. |
| 2015/0161386 | A1* | 6/2015 | Gupta ................. G06F 11/3612 726/23 |

FOREIGN PATENT DOCUMENTS

| | | |
|---|---|---|
| CN | 102156530 A | 8/2011 |
| CN | 102779257 A | 11/2012 |
| CN | 103544088 A | 1/2014 |
| CN | 103984538 A | 8/2014 |
| EP | 1313012 A1 | 5/2003 |
| EP | 2463776 A2 | 6/2012 |
| JP | 2000222057 A | 8/2000 |
| JP | 201274069 A | 9/2012 |
| TW | 200530918 A | 9/2005 |
| TW | 200538910 A | 12/2005 |
| WO | 2012100529 A1 | 8/2012 |

OTHER PUBLICATIONS

Partial English Translation and Abstract of Japanese Patent Application No. JP2000-222057, Nov. 2, 2016, 42 pages.
Niwa, I., et al., "A Method of Idiom Extraction Based on API Status of Use, and Automatic Software Categorization Using the Method," IPSJ SIG Technical Report, vol. 2013-SE-179, No. 3, Mar. 11, 2013, 8 pages.
English Translation of Niwa, I., et al., "A Method of Idiom Extraction Based on API Status of Use, and Automatic Software Categorization Using the Method," IPSJ SIG Technical Report, vol. 2013-SE-179, Mar. 11, 2013, 24 pages.
Oku, K., "Introduction to JSX, 2nd Half" Software Design, Gijutsu-Hyohron Co., No. 265, Nov. 18, 2012, pp. 122-127.
English Translation of "Introduction to JSX, 2nd Half" Software Design, Gijutsu-Hyohron Co., No. 265, Nov. 18, 2012, pp. 122-127.
Chigusa, K., "Mac OS X Anatomy Chapter 45 Assertion," MacPeople, ASCII Media Works Inc, vol. 18, No. 13, Aug. 29, 2012, pp. 130-131.
English Translation of "Mac OS X Anatomy Chapter 45 Assertion," MacPeople, ASCII Media Works Inc, vol. 18, No. 13, Aug. 29, 2012, pp. 130-131.
Foreign Communication From a Counterpart Application, Japanese Application No. 2016-509296, Japanese Office Action dated Aug. 30, 2016, 3 pages.
Foreign Communication From a Counterpart Application, Japanese Application No. 2016-509296, English Translation of Japanese Office Action dated Aug. 30, 2016, 3 pages.
Sato, Y., et al., "Extracting Parallelism in nested loop structures using run-time data dependency analysis," vol. 2009-ARC-184, No. 8, Aug. 4, 2009, 8 pages.
Foreign Communication From a Counterpart Application, Japanese Application No. 2016-509296, Japanese Rejection dated Jan. 4, 2017, 3 pages.
Foreign Communication From a Counterpart Application, Japanese Application No. 2016-509296, English Translation of Japanese Rejection dated Jan. 4, 2017, 3 pages.
Partial English Translation and Abstract of Chinese Patent Application No. CN101067757, Jul. 30, 2015, 6 pages.
Partial English Translation and Abstract of Chinese Patent Application No. CN103984538, Jul. 30, 2015, 4 pages.
Yoon, C., et al., "AppScope: Application Energy Metering Framework for Android Smartphones using Kernel Activity Monitoring," Proceedings of the USENIX conference on Annual Technical Conference, 2012, 14 pages.
Foreign Communication From a Counterpart Application, Taiwanese Application No. 10421338740, Taiwanese Office Action dated Oct. 2, 2015, 5 pages.
Foreign Communication From a Counterpart Application, Taiwanese Application No. 10421338740, Taiwanese Search Report dated Oct. 2, 2015, 1 pages.
Foreign Communication From a Counterpart Application, PCT Application No. PCT/CN2014/088793, English Translation of International Search Report dated Jan. 21, 2015, 2 pages.
Foreign Communication From a Counterpart Application, PCT Application No. PCT/CN2014/088793, English Translation of Written Opinion dated Jan. 21, 2015, 5 pages.
Gheorghita, S., et al., "Scenario Selection and Prediction for DVS-Aware Scheduling of Multimedia Applications," Journal of Signal Processing Systems, vol. 50, No. 2, Feb. 2008, pp. 137-161.
Foreign Communication From a Counterpart Application, European Application No. 14879273.2, Extended European Search Report dated Aug. 8, 2016, 10 pages.
Machine Translation and Abstract of Japanese Publication No. JP2012174069, Feb. 22, 2011, 48 pages.
Foreign Communication From a Counterpart Application, Korean Application No. 10-2015-7022402, Korean Notice of Allowance and Brief Translation dated Sep. 7, 2017, 4 pages.

\* cited by examiner

APPLICATION SCENARIO IDENTIFICATION METHOD, POWER CONSUMPTION MANAGEMENT METHOD, APPARATUS, AND TERMINAL DEVICE

CROSS-REFERENCE TO RELATED APPLICATIONS

This application is a continuation of International Application No. PCT/CN2014/088793, filed on Oct. 17, 2014, which claims priority to Chinese Patent Application No. 201410119905.0, filed on Mar. 27, 2014, both of which are hereby incorporated by reference in their entireties.

TECHNICAL FIELD

The present disclosure relates to the field of data processing technologies, and, to an application scenario identification method, a power consumption management method, an apparatus, and a terminal device.

BACKGROUND

As performance of a terminal device increases, power consumption of the terminal device becomes larger. To resolve a contradiction between high performance and low power consumption of the terminal device, power consumption of the terminal device needs to be controlled.

In the prior art, there has been a solution in which power consumption of a terminal device is controlled by identifying an application scenario. A principle of the solution is that: a central processing unit (CPU), a graphics processing unit (GPU), and a liquid crystal display (LCD) are controlled after different application scenarios are identified, thereby completing control on power consumption of the terminal device.

In the prior art, the solution of identifying an application scenario is implemented by monitoring a bottom-layer key event. A specific monitoring process may be that: A system application programming interface (API) related to a hardware operation is monitored by using a kernel; when it is detected that a kernel event occurs, that is, invoking of the system API occurs, then hardware use information is analyzed, and scenario information is obtained; and then, hardware power consumption is determined, and power consumption is controlled.

It is found that, in the prior art, a kernel monitoring event is related to a bottom layer, and several different upper-layer scenarios may be corresponding to one or more bottom-layer events of a same series. In this case, it is not accurate enough to identify an application scenario, which affects user experience.

SUMMARY

Embodiments of the present disclosure provide a method for identifying an application scenario of a terminal device, so as to relatively accurately identify an application scenario of a terminal device, thereby improving user experience of the terminal device.

The embodiments of the present disclosure further provide a method for managing power consumption of a terminal device, so as to relatively accurately determine a power consumption control policy, thereby improving user experience of the terminal device.

The embodiments of the present disclosure further provide a corresponding apparatus and terminal device.

According to a first aspect of the present disclosure, a method for identifying an application scenario of a terminal device is provided, including analyzing an application program running on a terminal device by means of compilation to obtain characteristic data of the application program, and determining, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

With reference to the first aspect, in a first possible implementation manner, the characteristic data of the application program includes static characteristic data and dynamic characteristic data, and the analyzing an application program running on a terminal device by means of compilation to obtain characteristic data of the application program includes when the application program is running, analyzing the application program by means of compilation to obtain one or more functions from the application program to serve as the static characteristic data, where the one or more functions are included in the application program, and are used to support normal use of one or more application functions in the application scenario currently used for the terminal device, and when a frequency of invoking a function in the one or more functions exceeds a preset threshold, determining that the function is the dynamic characteristic data.

With reference to the first aspect or the first possible implementation manner of the first aspect, in a second possible implementation manner, the method further includes receiving application scenario information of a newly added application scenario and corresponding characteristic data of an application program, and storing the application scenario information of the newly added application scenario and the corresponding characteristic data of an application program in the scenario characteristic data set.

With reference to the first aspect or the first possible implementation manner of the first aspect, in a third possible implementation manner, the method further includes receiving an instruction of deleting characteristic data of an application program of a specified application scenario, and deleting, from the scenario characteristic data set, application scenario information of the specified application scenario and corresponding characteristic data of an application program.

According to a second aspect of the present disclosure, a method for managing power consumption of a terminal device is provided, including analyzing an application program running on a terminal device by means of compilation to obtain characteristic data of the application program, determining, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device, and determining, from a control policy set according to the application scenario information, a power consumption control policy corresponding to the application scenario information, where the control policy set includes a correspondence between the multiple types of application scenario information and multiple power consumption control policies.

With reference to the second aspect, in a first possible implementation manner, the characteristic data of the application program includes static characteristic data and dynamic characteristic data, and the analyzing an application program running on a terminal device by means of compilation to obtain characteristic data of the application program includes when the application program is running, analyzing the application program by means of compilation to obtain one or more functions from the application program to serve as the static characteristic data, where the one or more functions are included in the application program, and are used to support normal use of one or more application functions in the application scenario currently used for the terminal device, and when a frequency of invoking a function in the one or more functions exceeds a preset threshold, determining that the function is the dynamic characteristic data.

With reference to the second aspect or the first possible implementation manner of the second aspect, in a second possible implementation manner, after the determining, from a control policy set according to the application scenario information, a power consumption control policy corresponding to the application scenario information, the method further includes generating a corresponding power consumption control instruction according to the power consumption control policy corresponding to the application scenario information, and transferring the corresponding power consumption control instruction to a kernel of the terminal device, so that power consumption control is performed by the kernel of the terminal device on corresponding hardware of the terminal device.

With reference to the second aspect or the first possible implementation manner of the second aspect, in a third possible implementation manner, the method further includes, receiving application scenario information of a newly added application scenario, corresponding characteristic data of an application program, and a corresponding power consumption control policy, storing the application scenario information of the newly added application scenario and the corresponding characteristic data of an application program in the scenario characteristic data set, and storing the application scenario information of the newly added application scenario and the corresponding power consumption control policy in the control policy set.

With reference to the second aspect or the first possible implementation manner of the second aspect, in a fourth possible implementation manner, the method further includes receiving an instruction of deleting characteristic data of an application program of a specified application scenario and a corresponding power consumption control policy, deleting, from the scenario characteristic data set, application scenario information of the specified application scenario and corresponding characteristic data of an application program, and deleting, from the control policy set, the application scenario information of the specified application scenario and a corresponding power consumption control policy.

According to a third aspect of the present disclosure, an application scenario identification apparatus is provided, including a first acquiring unit configured to analyze an application program running on a terminal device by means of compilation to obtain characteristic data of the application program, and a first scenario-characteristic-data-set managing unit configured to determine, from a scenario characteristic data set according to the characteristic data that is of the application program and is acquired by the first acquiring unit, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

With reference to the third aspect, in a first possible implementation manner, the characteristic data of the application program includes static characteristic data and dynamic characteristic data, where the first acquiring unit includes a first acquiring subunit configured to, when the application program is running, analyze the application program by means of compilation to obtain one or more functions from the application program to serve as the static characteristic data, where the one or more functions are included in the application program, and are used to support normal use of one or more application functions in the application scenario currently used for the terminal device, and a first determining subunit configured to, when a frequency, which is acquired by the first acquiring subunit, of invoking a function in one or more functions exceeds a preset threshold, determine that the function is the dynamic characteristic data.

With reference to the third aspect or the first possible implementation manner of the third aspect, in a second possible implementation manner, the identification apparatus further includes a first receiving unit, where the first receiving unit is configured to receive application scenario information of a newly added application scenario and corresponding characteristic data of an application program, and the first scenario-characteristic-data-set managing unit is further configured to store, in the scenario characteristic data set, the application scenario information of the newly added application scenario and the corresponding characteristic data of an application program that are received by the first receiving unit.

With reference to the second possible implementation manner of the third aspect, in a third possible implementation manner, the first receiving unit is further configured to receive an instruction of deleting characteristic data of an application program of a specified application scenario, and the first scenario-characteristic-data-set managing unit is further configured to delete, from the scenario characteristic data set according to the instruction received by the first receiving unit, application scenario information of the specified application scenario and corresponding characteristic data of an application program.

According to a fourth aspect of the present disclosure, a power consumption management apparatus is provided, including a second acquiring unit configured to analyze an application program running on a terminal device by means of compilation to obtain characteristic data of the application program, a second scenario characteristic data set managing unit configured to determine, from a scenario characteristic data set according to the characteristic data that is of the application program and is acquired by the second acquiring unit, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device, and a control policy set management unit configured to determine, from a control policy set according to the application scenario information determined by the second scenario characteristic data set managing unit, a power consumption control policy corresponding to the application scenario information, where the control policy set includes a correspondence between the multiple types of application scenario information and multiple power consumption control policies.

With reference to the fourth aspect, in a first possible implementation manner, the characteristic data of the application program includes static characteristic data and dynamic characteristic data; and the second acquiring unit includes a second acquiring subunit configured to, when the application program is running, analyze the application program by means of compilation to obtain one or more functions from the application program to serve as the static characteristic data, where the one or more functions are included in the application program, and are used to support normal use of one or more application functions in the application scenario currently used for the terminal device, and a second determining subunit configured to, when a frequency, which is acquired by the second acquiring subunit, of invoking a function in the one or more functions exceeds a preset threshold, determine that the function is the dynamic characteristic data.

With reference to the fourth aspect or the first possible implementation manner of the fourth aspect, in a second possible implementation manner, the power consumption management apparatus further includes a generating unit configured to generate a corresponding power consumption control instruction according to the power consumption control policy that corresponds to the application scenario information and is determined by the control policy set management unit, and a transferring unit configured to transfer the corresponding power consumption control instruction generated by the generating unit to a kernel of the terminal device, so that power consumption control is performed by the kernel of the terminal device on corresponding hardware of the terminal device.

With reference to the fourth aspect or the first possible implementation manner of the fourth aspect, in a third possible implementation manner, the power consumption management apparatus further includes a second receiving unit, where the second receiving unit is configured to receive application scenario information of a newly added application scenario, corresponding characteristic data of an application program, and a corresponding power consumption control policy, the second scenario characteristic data set managing unit is further configured to store, in the scenario characteristic data set, the application scenario information of the newly added application scenario and the corresponding characteristic data of an application program that are received by the second receiving unit, and the control policy set management unit is further configured to store, in the control policy set, the application scenario information of the newly added application scenario and the corresponding power consumption control policy that are received by the second receiving unit.

With reference to the third possible implementation manner of the fourth aspect, in a fourth possible implementation manner, the second receiving unit is further configured to receive an instruction of deleting characteristic data of an application program of a specified application scenario and a corresponding power consumption control policy, the second scenario characteristic data set managing unit is further configured to delete, from the scenario characteristic data set according to the instruction received by the second receiving unit, application scenario information of the specified application scenario and corresponding characteristic data of an application program, and the control policy set management unit is further configured to delete, from the control policy set according to the instruction received by the second receiving unit, the application scenario information of the specified application scenario and a corresponding power consumption control policy.

According to a fifth aspect of the present disclosure, a terminal device is provided, including a screen component and a processor, where the screen component is configured for a user to trigger starting of an application program, and the processor is configured to run the application program, where the processor is further configured to analyze the running application program by means of compilation to obtain characteristic data of the application program; and determine, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

According to a sixth aspect of the present disclosure, a terminal device is provided, including a screen component and a processor, where the screen component is configured for a user to trigger starting of an application program, and the processor is configured to run the application program, where the processor is further configured to analyze the running application program by means of compilation to obtain characteristic data of the application program; determine, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; determine, from a control policy set according to the application scenario information, a power consumption control policy corresponding to the application scenario information, where the control policy set includes a correspondence between the multiple types of application scenario information and multiple power consumption control policies; and implement power consumption control on corresponding hardware of the terminal device according to the power consumption control policy corresponding to the application scenario information, where the corresponding hardware of the terminal device includes one or more of: the screen component and the processor.

In the embodiments of the present disclosure, an application program running on a terminal device is analyzed by means of compilation to obtain characteristic data of the application program; and application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device. Compared with the prior art in which an application scenario is determined by monitoring a bottom-layer event by a kernel, particularly, when multiple different upper-layer scenarios correspond to a bottom-layer event of a same series, in the embodiments of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate. Therefore, according to the application scenario identification method provided in the embodiments of the present disclosure, an application scenario of a terminal device can be relatively accurately identified, thereby further improving user experience of the terminal device.

In the embodiments of the present disclosure, an application program running on a terminal device is analyzed by means of compilation to obtain characteristic data of the application program; application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; and a power consumption control policy corresponding to the application scenario information is determined from a control policy set according to the application scenario information, where the control policy set includes a correspondence between the multiple types of application scenario information and multiple power consumption control policies. Compared with the prior art in which an application scenario is determined by monitoring a bottom-layer event by a kernel, particularly, when multiple different upper-layer scenarios correspond to a bottom-layer event of a same series, in the embodiments of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate, and further a power consumption control policy corresponding to the application scenario information is also relatively accurate. Therefore, according to the power consumption management method provided in the embodiments of the present disclosure, an application scenario of a terminal device can be relatively accurately identified, so that a power consumption control policy is relatively accurately determined, thereby further improving user experience of the terminal device.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

Embodiments of the present disclosure provide a method for identifying an application scenario of a terminal device, so as to relatively accurately identify an application scenario of a terminal device, thereby improving user experience of the terminal device.

The embodiments of the present disclosure further provide a method for managing power consumption of a terminal device, so as to relatively accurately determine a power consumption control policy, thereby improving user experience of the terminal device.

The embodiments of the present disclosure further provide a corresponding apparatus and terminal device. Details are separately described in the following.

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person skilled in the art based on the embodiments of the present disclosure without creative efforts shall fall within the protection scope of the present disclosure.

Figure 1:
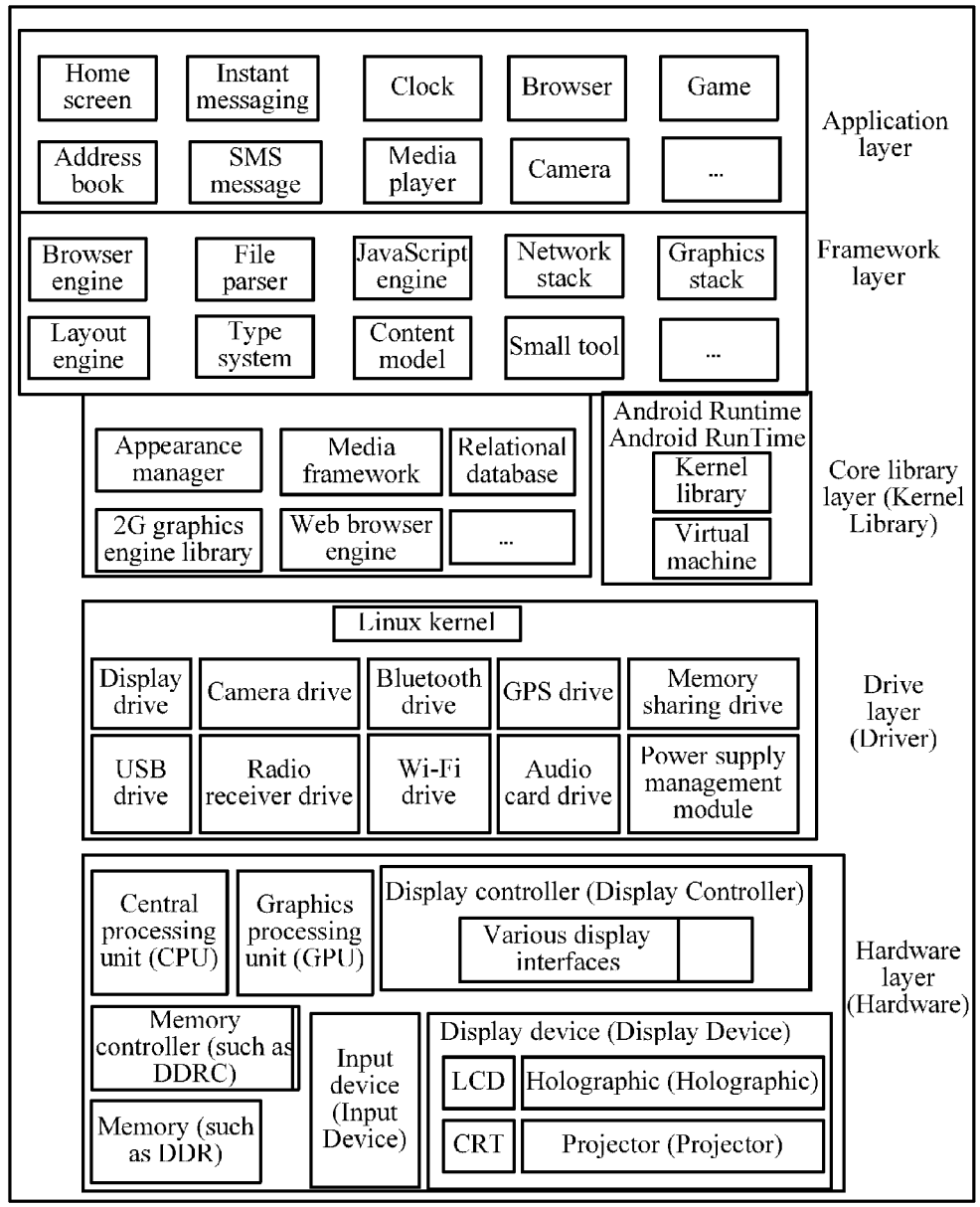
FIG. 1 is a schematic diagram of an embodiment of a system architecture of a terminal device according to an embodiment of the present disclosure.
Figure 2:
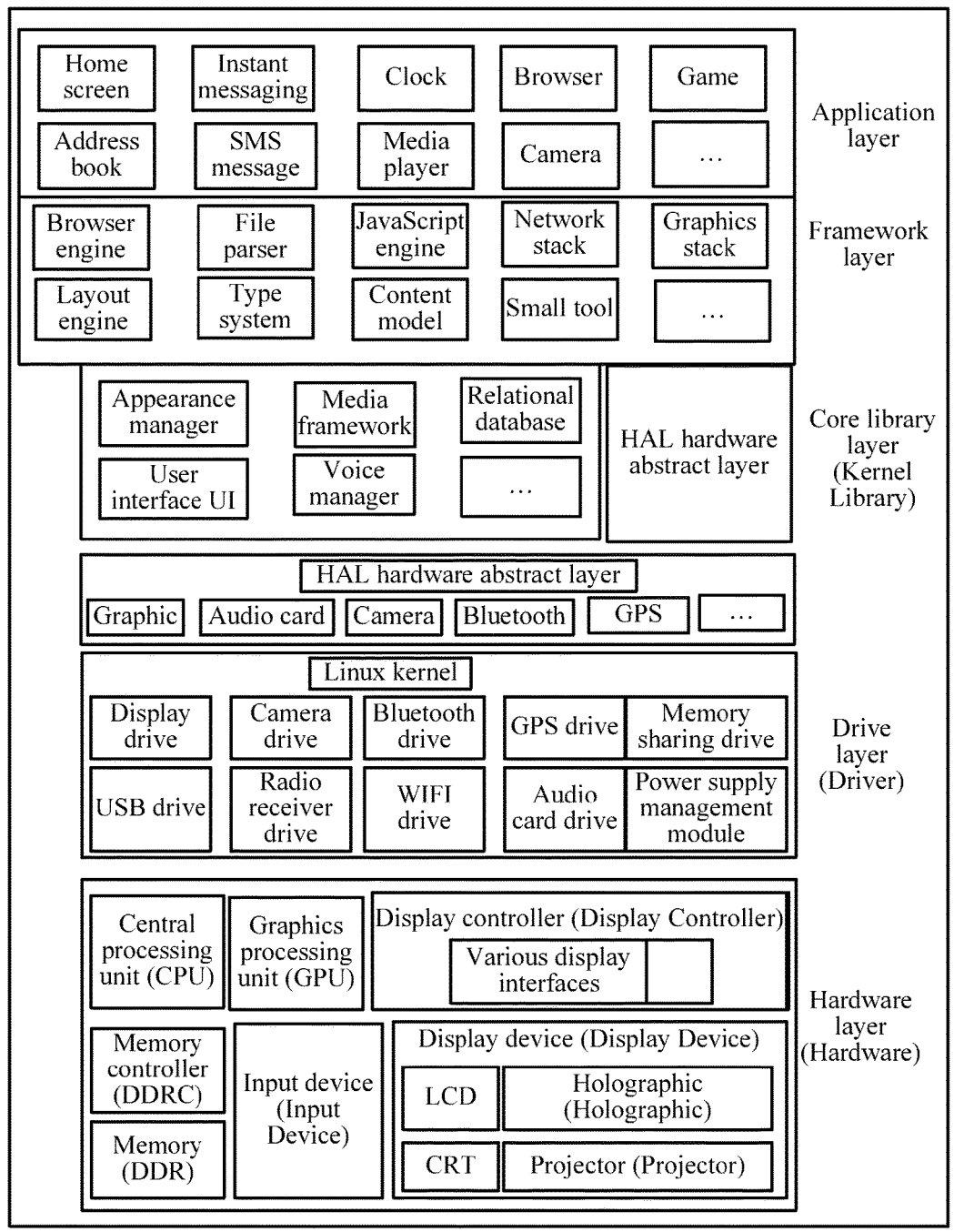
FIG. 2 is a schematic diagram of another embodiment of a system architecture of a terminal device according to an embodiment of the present disclosure.

Referring to FIG. 1 and FIG. 2, both FIG. 1 and FIG. 2 are schematic structural diagrams of a terminal device according to embodiments of the present disclosure.

FIG. 1 and FIG. 2 are used as examples to introduce a logical structure of a computing node applied in an application scenario identification method or a power consumption management method provided in the embodiments of the present disclosure. The computing node may be a terminal device, and the terminal device may be a smartphone. As shown in FIG. 1 and FIG. 2, a hardware layer of the terminal device includes a CPU, a GPU, and the like. Definitely, the hardware layer of the terminal device may further include a storage, an input/output device, a memory, a memory controller, a network interface, and the like, where the input device may include a keyboard, a mouse, a touchscreen, and the like, and the output device may include a display device, such as a LCD, a cathode ray tube (CRT), and a holographic, a projector. An operating system (OS) (such as Android or Firefox) and some application programs may run on the hardware layer.

The Android system is used as an example in FIG. 1 to introduce a software system architecture of the terminal device, where a core library is a core part of the operating system and includes an appearance manager, a media framework, a relational database, a second generation (2G) graphics engine library, a Web browser engine, a kernel library, a virtual machine (for example, a Dalvik Virtual Machine), and the like. Identification of an application scenario and determining of a power consumption control policy that are described in this embodiment of the present disclosure may be implemented at a virtual machine (for example, a Dalvik Virtual Machine). That is, the virtual machine analyzes an application program running on the terminal device by means of compilation to obtain characteristic data of the application program; determines, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; determines, from a control policy set according to the application scenario information, a power consumption control policy corresponding to the application scenario information, where the control policy set includes a correspondence between the multiple types of application scenario information and multiple power consumption control policies; generates a corresponding power consumption control instruction according to the power consumption control policy corresponding to the application scenario information; and transfers the power consumption control instruction to a kernel (that is, a Linux kernel in FIG. 1), so that power consumption control is performed by the kernel on corresponding hardware (for example, a CPU, a GPU, or a display device) of the terminal device.

In addition, the terminal device further includes a drive layer, a framework layer, and an application layer, where the drive layer may include a CPU drive, a GPU drive, a display controller drive, and the like; the framework layer may include a browser engine, a layout engine, a file parser, and the like; and the application layer may include multiple application programs, such as a home screen, a media player, and a browser.

The Firefox OS is used as an example in FIG. 2 to introduce a software system architecture of the terminal device, where a core library is a core part of the operating system and includes an appearance manager, a media framework, a relational database, a user interface, a voice manager, and the like.

In addition to the core library layer and the hardware layer, the terminal device further includes a drive layer, a framework layer, and an application layer, where the drive layer may include a CPU drive, a GPU drive, a display controller drive, and the like.

The framework layer may include a browser engine, a layout engine, a file parser, a JavaScript engine, and the like. The identification of an application scenario and the determining of a power consumption control policy that are described in this embodiment of the present disclosure may be implemented at the JavaScript engine. That is, the JavaScript engine analyzes an application program running on the terminal device by means of compilation to obtain characteristic data of the application program; determines, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; determines, from a control policy set according to the application scenario information, a power consumption control policy corresponding to the application scenario information, where the control policy set includes a correspondence between the multiple types of application scenario information and multiple power consumption control policies; generates a corresponding power consumption control instruction according to the power consumption control policy corresponding to the application scenario information; and transfers the power consumption control instruction to a kernel (that is, a Linux kernel in FIG. 2), so that power consumption control is performed by the kernel on corresponding hardware (for example, a CPU, a GPU, or a display device) of the terminal device.

The application layer may include multiple application programs, such as a home screen, a media player, and a browser.

It should be noted that, according to the embodiments of the present disclosure, an application program running on a terminal device is analyzed by means of compilation to obtain characteristic data of the application program; application scenario information that corresponds to or matches the characteristic data of the application program and is used to indicate an application scenario currently used for the terminal device is determined according to a scenario characteristic data set, so as to resolve intelligent identification of an application scenario of a terminal device (for example, a smartphone), and achieve that: an identification method can be applied in different platforms, for example, can be applied in an operating system of a smartphone, such as Android or Firefox OS, and a same identification method may be used for different operating systems, and power consumption management control on a terminal device (for example, a smartphone) based on a highly refined scenario can further be completed.

Figure 3:
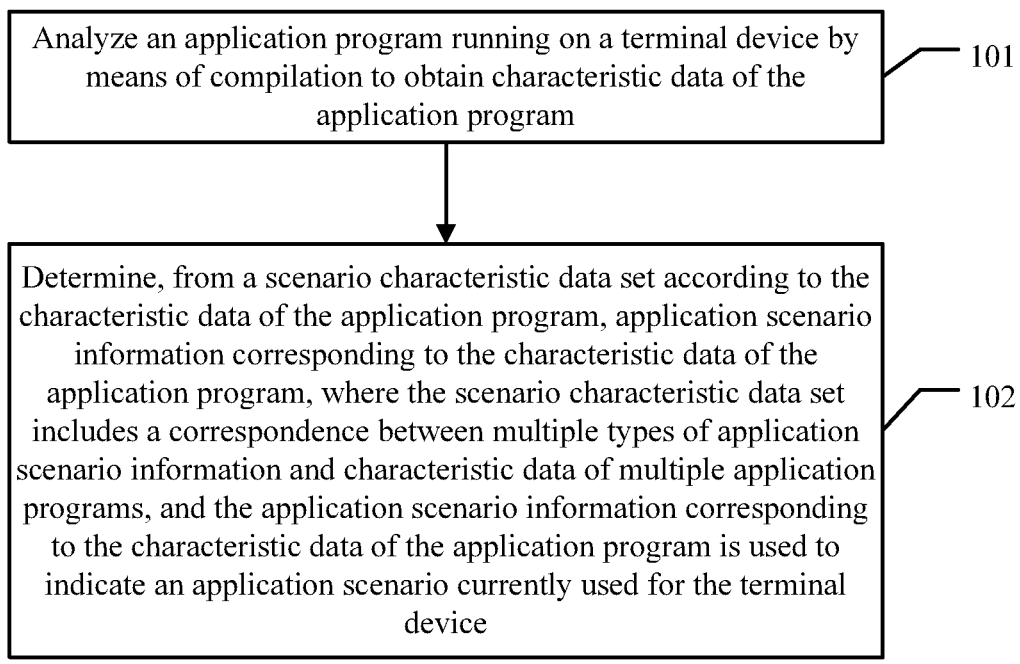
FIG. 3 is a schematic diagram of an embodiment of an application scenario identification method according to an embodiment of the present disclosure.

Referring to FIG. 3, an embodiment of a method for identifying an application scenario of a terminal device according to an embodiment of the present disclosure includes the following steps 101. Analyze an application program running on a terminal device by means of compilation to obtain characteristic data of the application program.

There may be multiple application programs installed on the terminal device, for example, all application programs that already exist, such as a game program, a video program, a WeChat program, a short message system (SMS) message program, a call program, and a payment program.

A running application program refers to a running program that has been started by a user, for example, after the user triggers starting of WeChat, the WeChat program is a running program. Definitely, multiple application programs may run at the same time.

Characteristic data of an application program refers to one or more functions that are included in the application program. Definitely, the one or more functions may also be understood as a set of functions that are included in the application program.

102. Determine, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

The scenario characteristic data set may be stored in a file, or may be stored in a database. It should be understood that the application scenario identification method in this embodiment of the present disclosure is based on the scenario characteristic data set, which facilitates an upgrade and features high scalability. For example, if an application scenario is to be added, in the prior art, a read only memory (ROM) in a system needs to be updated; however, according to the present disclosure, only a scenario characteristic data set (for example, a scenario characteristic data file) needs to be updated without restarting a system, and therefore, user experience of a terminal user is better.

The scenario characteristic data set is determined in advance by a developer by performing a large quantity of tests. The application scenario information may be an identifier of an application scenario, which indicates an application scenario currently used for the terminal device, for example, a WeChat scenario, a game scenario, or a video scenario. For the correspondence between multiple types of application scenario information and characteristic data of multiple application programs, reference may be made to Table 1 for understanding

TABLE 1

Correspondence between application scenario information and characteristic data of an application program

| Application scenario information | Characteristic data of an application program |
|---|---|
| Game scenario information | Characteristic data of a game program |
| Video scenario information | Characteristic data of a video program |
| WeChat scenario information | Characteristic data of a WeChat program |
| SMS message scenario information | Characteristic data of an SMS message program |
| Call scenario information | Characteristic data of a call program |
| Payment scenario information | Characteristic data of a payment program |

Definitely, Table 1 is only an example for illustration, there may be more correspondences between application scenario information and characteristic data of application programs, which are not listed one by one herein.

It can be seen that, in this embodiment of the present disclosure, an application program running on a terminal device is analyzed by means of compilation to obtain characteristic data of the application program; and application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate. Therefore, the application scenario identification method provided in this embodiment of the present disclosure can relatively accurately identify an application scenario of a terminal device, thereby further improving user experience of the terminal device.

Optionally, based on the foregoing embodiment corresponding to FIG. 3, in another embodiment of a method for identifying an application scenario of a terminal device according to an embodiment of the present disclosure, the characteristic data of the application program includes static characteristic data and dynamic characteristic data.

The analyzing an application program running on a terminal device by means of compilation to obtain characteristic data of the application program may include when the application program is running, analyzing the application program by means of compilation to obtain one or more functions from the application program to serve as the static characteristic data, where the one or more functions are included in the application program, and are used to support normal use of one or more application functions in the application scenario currently used for the terminal device, and when a frequency of invoking any function in the one or more functions exceeds a preset threshold, determining that the any function is the dynamic characteristic data.

In this embodiment of the present disclosure, an application program includes one or more functions, and the one or more functions may be compiled by using different languages; however, each function is used to support normal use of one function in an application scenario. By using a WeChat scenario an example, an application program corresponding to the WeChat scenario includes a function supporting a voice chat, a function supporting a text chat, and a function supporting browsing of Moments.

The one or more functions and the any function in this embodiment of the present disclosure all refer to the function itself or functions themselves, for example, a function that is compiled by using a C++ or Java language.

All these functions that are included in an application program may be understood as the static characteristic data of the application program. A frequently invoked function may be understood as the dynamic characteristic data of the application program, where a frequency of the invoking may be represented by a specific numeric value. For example, a threshold of 5 times one hour is set. If the function has been invoked for more than 5 times within one hour, it may be considered that the function is the dynamic characteristic data. For example, in the WeChat scenario, if a function supporting browsing of Moments is frequently invoked and the function becomes a hotspot function, the function supporting browsing of Moments is considered as the dynamic characteristic data.

Further, in this embodiment of the present disclosure, in some application scenarios, static characteristic data is the same but dynamic characteristic data is different; therefore, an application scenario determined by combining the static characteristic data and the dynamic characteristic data is the most accurate. A news client is used as an example, where the news client includes text news and video news. Static characteristic data of the text news and static characteristic data of the video news are all obtained from an application program of the news client; therefore, obtained static characteristic data is the same. However, a frequently invoked function of the text news may be a function A in the static characteristic data, and a frequently invoked function of the video news may be a function B in the static characteristic data, where a text news scenario may be accurately distinguished from a video news scenario according to the function A and the function B. Therefore, in this embodiment of the present disclosure, an application scenario used for a terminal device is identified by combining static characteristic data and dynamic characteristic data, which can improve an accuracy rate of identifying an application scenario used for a terminal device.

Optionally, based on the foregoing embodiment corresponding to FIG. 3 or the optional embodiment corresponding to FIG. 3, in another embodiment of a method for identifying an application scenario of a terminal device according to an embodiment of the present disclosure, the method may further include receiving application scenario information of a newly added application scenario and corresponding characteristic data of an application program, and storing the application scenario information of the newly added application scenario and the corresponding characteristic data of an application program in the scenario characteristic data set.

Further, in this embodiment of the present disclosure, when there is a newly added application scenario, an update or an upgrade of the scenario characteristic data set can be implemented merely by storing, in the scenario characteristic data set, application scenario information of the newly added application scenario and corresponding characteristic data of an application program, which accelerates a speed of a data update or upgrade.

Optionally, based on the foregoing embodiment corresponding to FIG. 3 or the optional embodiment corresponding to FIG. 3, in another embodiment of a method for identifying an application scenario of a terminal device according to an embodiment of the present disclosure, the method may further include receiving an instruction of deleting characteristic data of an application program of a specified application scenario, and deleting, from the scenario characteristic data set, application scenario information of the specified application scenario and corresponding characteristic data of an application program.

Further, in this embodiment of the present disclosure, when some application programs are no longer used, application scenario information and characteristic data that corresponds to the application programs may be directly deleted from the scenario characteristic data set, thereby saving memory space.

Figure 4:
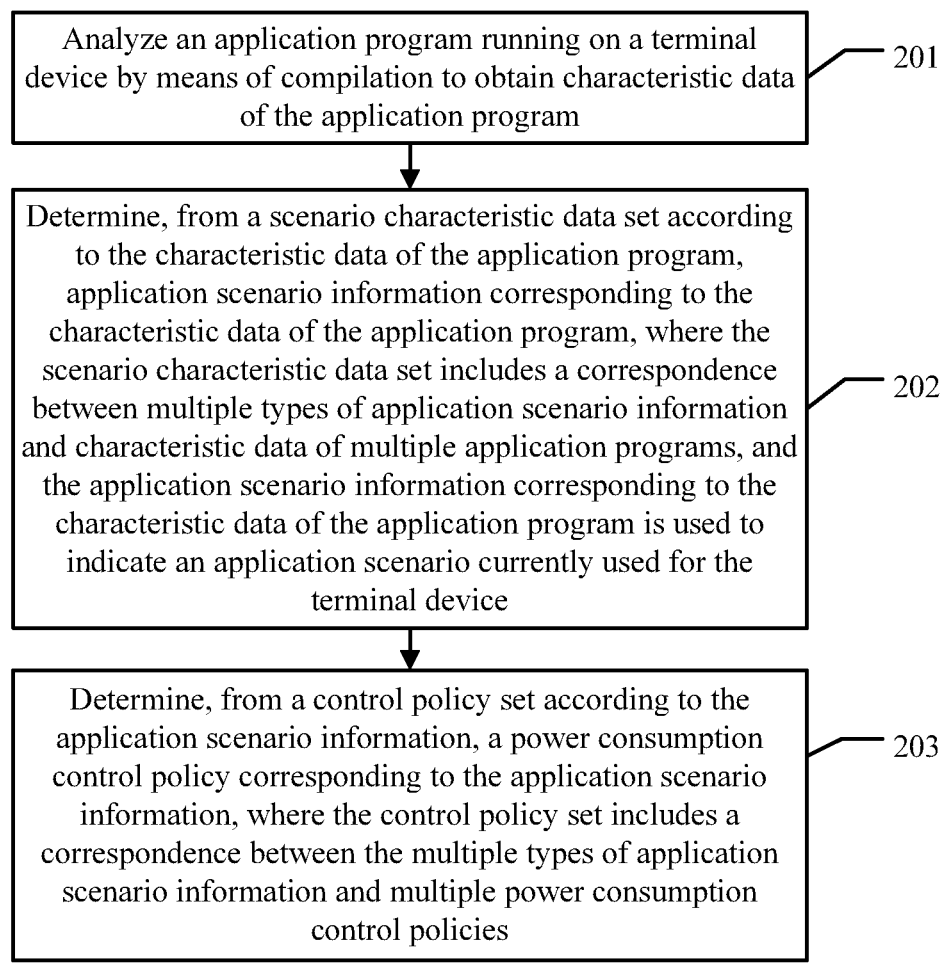
FIG. 4 is a schematic diagram of an embodiment of a power consumption management method according to an embodiment of the present disclosure.

Referring to FIG. 4, an embodiment of a method for managing power consumption of a terminal device according to an embodiment of the present disclosure includes the following steps 201. Analyze an application program running on a terminal device by means of compilation to obtain characteristic data of the application program.

For a process of step 201, reference may be made to step 101 for understanding, and details are not described herein again.

202. Determine, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

For a process of step 202, reference may be made to step 102 for understanding, and details are not described herein again.

The scenario characteristic data set may be stored in a file, or may be stored in a database.

203. Determine, from a control policy set according to the application scenario information, a power consumption control policy corresponding to the application scenario information, where the control policy set includes a correspondence between the multiple types of application scenario information and multiple power consumption control policies.

The control policy set may be stored in a file, or may be stored in a database.

The control policy set is also determined in advance by a developer by performing a large quantity of tests, and is preset on the terminal device. For each piece of application scenario information, there is a corresponding power consumption control policy.

It can be seen that, in this embodiment of the present disclosure, an application program running on a terminal device is analyzed by means of compilation to obtain characteristic data of the application program; application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; and a power consumption control policy corresponding to the application scenario information is determined from a control policy set according to the application scenario information, where the control policy set includes a correspondence between the multiple types of application scenario information and multiple power consumption control policies. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate, and further a power consumption control policy corresponding to the application scenario information is also relatively accurate. Therefore, the power consumption management method provided in the embodiments of the present disclosure can relatively accurately identify an application scenario of a terminal device, so as to accurately determine a power consumption control policy, thereby improving user experience of the terminal device.

Optionally, based on the foregoing embodiment corresponding to FIG. 4, in another embodiment of a method for managing power consumption of a terminal device according to an embodiment of the present disclosure, the characteristic data of the application program includes static characteristic data and dynamic characteristic data.

The analyzing an application program running on a terminal device by means of compilation to obtain characteristic data of the application program may include when the application program is running, analyzing the application program by means of compilation to obtain one or more functions from the application program to serve as the static characteristic data, where the one or more functions are included in the application program, and are used to support normal use of one or more application functions in the application scenario currently used for the terminal device, and when a frequency of invoking any function in the one or more functions exceeds a preset threshold, determining that the any function is the dynamic characteristic data.

In this embodiment of the present disclosure, an application program includes one or more functions, and the one or more functions may be compiled by using different languages; however, each function is used to support normal use of one function in an application scenario. By using a WeChat scenario an example, an application program corresponding to the WeChat scenario needs to include a function supporting a voice chat, a function supporting a text chat, and a function supporting browsing of Moments.

The one or more functions and the any function in this embodiment of the present disclosure all refer to the function or functions, for example, a function that is compiled by using a C++ or Java language.

All these functions that are included in an application program may be understood as the static characteristic data of the application program. A frequently invoked function may be understood as the dynamic characteristic data of the application program, where a frequency of the invoking may be represented by a specific numeric value. For example, a threshold of 5 times one hour is set. If the function has been invoked for more than 5 times within one hour, it may be considered that the function is the dynamic characteristic data. For example, in the WeChat scenario, if a function supporting browsing of Moments is frequently invoked and the function becomes a hotspot function, the function supporting browsing of Moments is considered as the dynamic characteristic data.

Further, in this embodiment of the present disclosure, in some application scenarios, static characteristic data is the same but dynamic characteristic data is different; therefore, an application scenario determined by combining the static characteristic data and the dynamic characteristic data is the most accurate. A news client is used as an example, where the news client includes text news and video news. Static characteristic data of the text news and static characteristic data of the video news are all obtained from an application program of the news client; therefore, static characteristic data obtained is the same. However, a frequently invoked function of the text news may be a function A in the static characteristic data, and a frequently invoked function of the video news may be a function B in the static characteristic data, where a text news scenario may be accurately distinguished from a video news scenario according to the function A and the function B. Therefore, in this embodiment of the present disclosure, an application scenario used for a terminal device is identified by combining static characteristic data and dynamic characteristic data, which can improve an accuracy rate of identifying an application scenario used for a terminal device.

Optionally, based on the foregoing embodiment corresponding to FIG. 4 or the optional embodiment, in another embodiment of a method for managing power consumption of a terminal device according to an embodiment of the present disclosure, after the determining, from a control policy set according to the application scenario information, a power consumption control policy corresponding to the application scenario information, the method may further include generating a corresponding power consumption control instruction according to the power consumption control policy corresponding to the application scenario information, and transferring the corresponding power consumption control instruction to a kernel of the terminal device, so that power consumption control is performed by the kernel of the terminal device on corresponding hardware of the terminal device.

Further, in this embodiment of the present disclosure, after the power consumption control policy is determined, the corresponding power consumption control instruction is generated according to the power consumption control policy, and then the kernel performs power consumption control.

Optionally, based on the foregoing embodiment corresponding to FIG. 4 or the optional embodiment, in another embodiment of a method for managing power consumption of a terminal device according to an embodiment of the present disclosure, the method may further include receiving application scenario information of a newly added application scenario, corresponding characteristic data of an application program, and a corresponding power consumption control policy, storing the application scenario information of the newly added application scenario and the corresponding characteristic data of an application program in the scenario characteristic data set, and storing the application scenario information of the newly added application scenario and the corresponding power consumption control policy in the control policy set.

In this embodiment of the present disclosure, after there is a newly added application scenario, a developer may extract corresponding characteristic data of an application program for the newly added application scenario; determine a corresponding power consumption control policy; and then only need to deliver, to a terminal device by using a server, application scenario information of the newly added application scenario, the corresponding characteristic data of an application program, and the corresponding power consumption control policy. The terminal device stores, in the scenario characteristic data set, the application scenario information of the newly added application scenario and the corresponding characteristic data of an application program; and stores, in the control policy set, the application scenario information of the newly added application scenario and the corresponding power consumption control policy, which accelerates a speed of upgrading of characteristic data of a newly added application scenario and a power consumption control policy.

Optionally, based on the foregoing embodiment corresponding to FIG. 4 or the optional embodiment, in another embodiment of a method for managing power consumption of a terminal device according to an embodiment of the present disclosure, the method may further include receiving an instruction of deleting characteristic data of an application program of a specified application scenario and a corresponding power consumption control policy, deleting, from the scenario characteristic data set, application scenario information of the specified application scenario and corresponding characteristic data of an application program, and deleting, from the control policy set, the application scenario information of the specified application scenario and a corresponding power consumption control policy.

In this embodiment of the present disclosure, when some application programs are no longer used, application scenario information of a specified application scenario and corresponding characteristic data of an application program, and the application scenario information of the specified application scenario and a corresponding power consumption control policy may be respectively deleted directly from the scenario characteristic data set and the control policy set according to a deleting instruction.

Characteristic data of an application program and a power consumption control policy in this embodiment of the present disclosure are determined in advance by a developer by performing a large quantity of tests; a correspondence between characteristic data of an application program and application scenario information, and a correspondence between a power consumption control policy and the application scenario information are established and respectively stored in a scenario characteristic data set and a control policy set; and the scenario characteristic data set and the control policy set are prestored or dynamically loaded in the terminal device.

Figure 5:
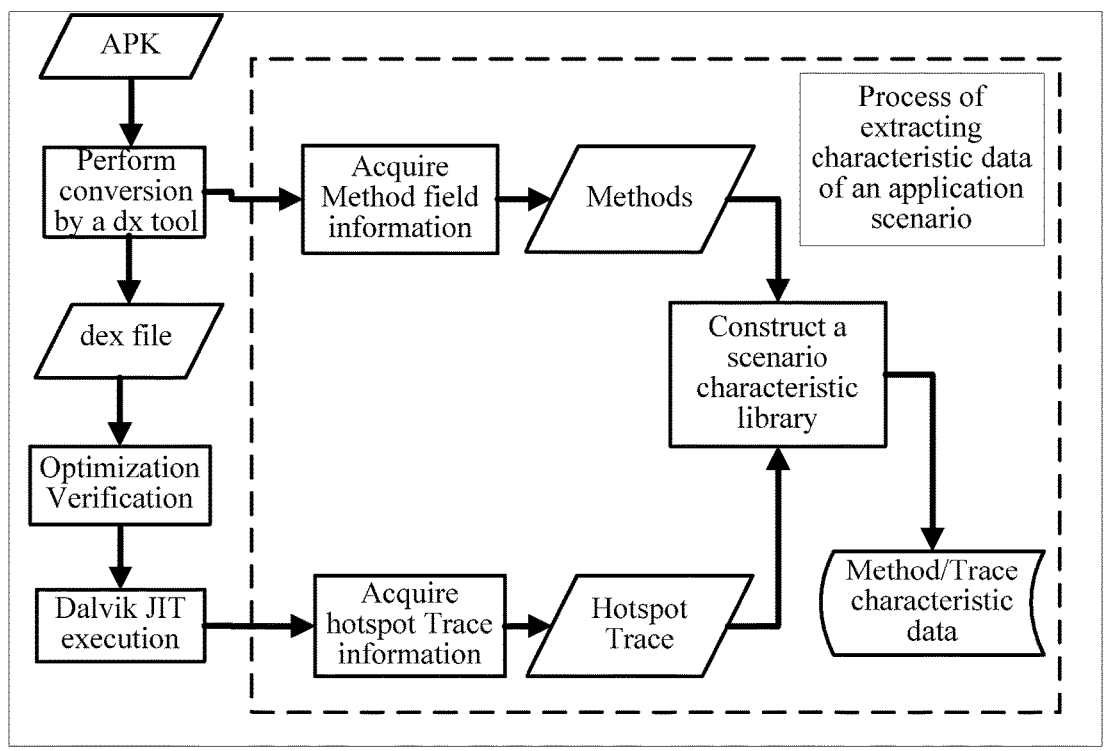
FIG. 5 is a schematic diagram of another embodiment of a power consumption management method according to an embodiment of the present disclosure.

For a process in which a developer extracts characteristic data of an application program in a test phase, reference may be made to FIG. 5 for understanding. As shown in FIG. 5, an Android system is used as an example. An application program used in a terminal device runs on a dalvik virtual machine. The dalvik virtual machine first uses a dx tool to convert a running application program APK file into a dex file, so that Java bytecode is translated into a bytecode form of the dalvik virtual machine; and finally interpreted, or executed by means of just-in-time compilation (JIT) by the virtual machine.

The dex file is divided into seven parts, where a Method field records a method of a Java level or a system API that is invoked by the application program. Either the method of the Java level or the system API is a function, and Method information is read by using the dx tool, where the Method information actually is a set of one or more functions, and static characteristic data of the application program can be obtained.

A running manner after the Dalvik introduces JIT is as follows: The virtual machine starts running in a manner of interpretation and execution, and begins to collect statistics of a frequency of invoking one or more functions in the Method information. When a frequency of invoking any function exceeds a preset upper limit, a compiler thread is started for starting compilation. The any function may be acquired by means of JIT, and dynamic characteristic data of the application program, that is, trace information in FIG. 5, is obtained.

After the developer extracts characteristic data of each application program, a corresponding power consumption control policy is made for each application scenario. For application scenario information, characteristic data of an application program, and a corresponding power consumption control policy, reference may be made to Table 2a for understanding.

TABLE 2a

Table of application scenario information, characteristic data of an application program, and a corresponding power consumption control policy

| Application scenario information | Characteristic data of an application program | Power consumption control policy |
| --- | --- | --- |
| Game scenario information | Characteristic data of a game program | Improve an LCD refresh rate and reduce a GPU working frequency |
| Video scenario information | Characteristic data of a video program | Improve an LCD refresh rate and reduce a GPU working frequency |
| WeChat scenario information | Characteristic data of a WeChat program | Reduce a GPU working frequency |
| SMS message scenario information | Characteristic data of an SMS message program | Reduce GPU and CPU working frequencies |
| Call scenario information | Characteristic data of a call program | Reduce a GPU working frequency and an LCD refresh rate |
| Payment scenario information | Characteristic data of a payment program | Improve an LCD refresh rate and reduce a GPU working frequency |

Definitely, Table 2a is used only as an example for illustration herein, and actually, a correspondence among application scenario information, characteristic data of an application program, and a power consumption control policy may also be set in another implementation manner, for example, the following Table 2b-1 and Table 2b-2.

TABLE 2b-1

Table of application scenario information and corresponding characteristic data of an application program

| Application scenario information | Characteristic data of an application program |
|---|---|
| Game scenario information | Characteristic data of a game program |
| Video scenario information | Characteristic data of a video program |
| WeChat scenario information | Characteristic data of a WeChat program |
| SMS message scenario information | Characteristic data of an SMS message program |
| Call scenario information | Characteristic data of a call program |
| Payment scenario information | Characteristic data of a payment program |

TABLE 2b-2

Table of application scenario information and a corresponding power consumption control policy

| Application scenario information | Power consumption control policy |
|---|---|
| Game scenario information | Improve an LCD refresh rate and reduce a GPU working frequency |
| Video scenario information | Improve an LCD refresh rate and reduce a GPU working frequency |
| WeChat scenario information | Reduce a GPU working frequency |
| SMS message scenario information | Reduce GPU and CPU working frequencies |
| Call scenario information | Reduce a GPU working frequency and an LCD refresh rate |
| Payment scenario information | Improve an LCD refresh rate and reduce a GPU working frequency |

Figure 6:
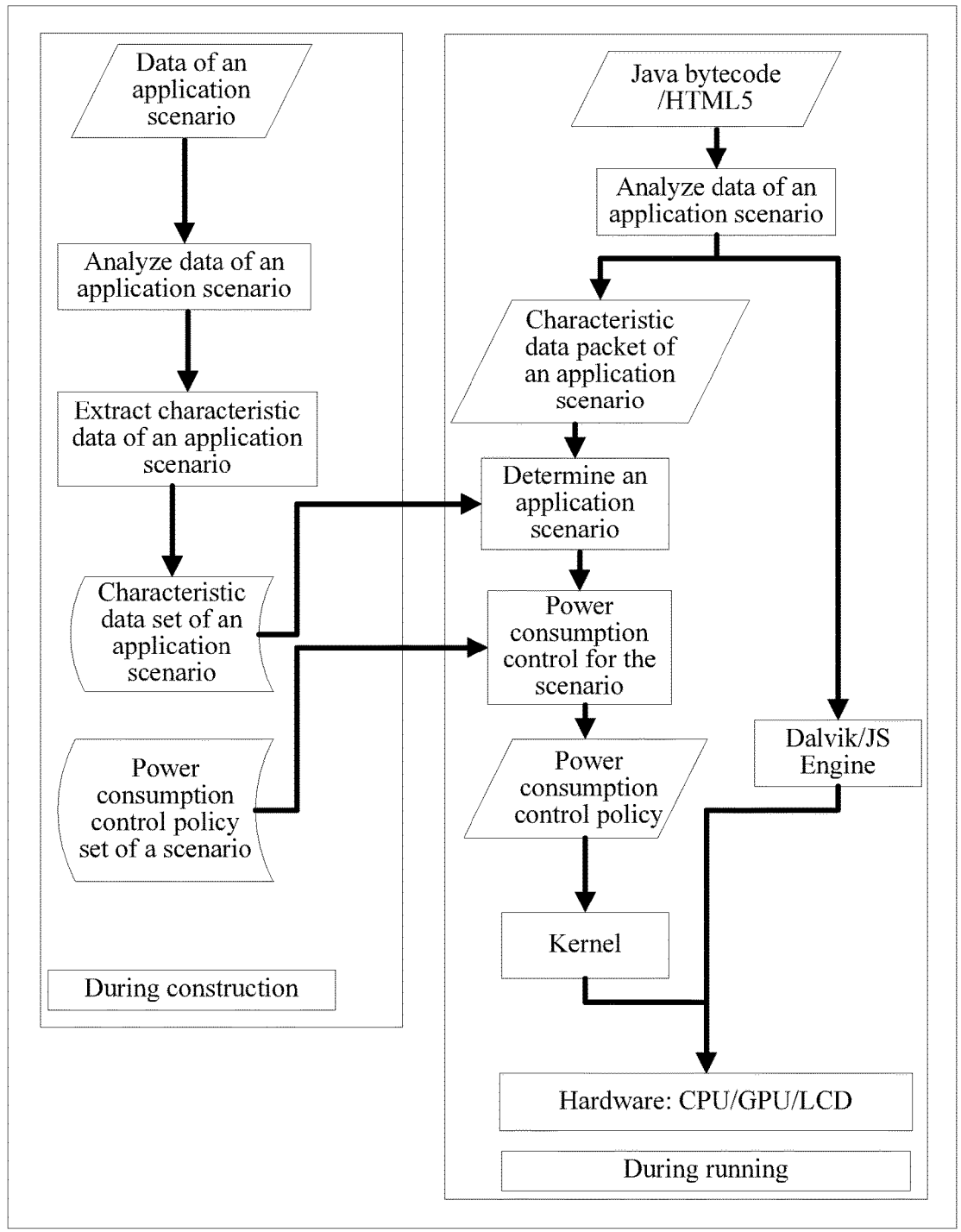
FIG. 6 is a schematic diagram of another embodiment of a power consumption management method according to an embodiment of the present disclosure.

For a process of combining a construction phase and a running phase, reference may be made to FIG. 6 for understanding. During construction, the developer runs an application program in a test device, the test device analyzes the running application program, characteristic data of the application program is extracted according to a process shown in FIG. 5, and a power consumption control policy is made for the extracted characteristic data of the application program. For a correspondence between characteristic data of an application program and a power consumption control policy, reference may be made to Table 2a for understanding.

In the running phase, a scenario characteristic data set and a control policy set have been preset in the terminal device. Therefore, when an application scenario is used in the terminal device, a virtual machine of the terminal device analyzes a running application program; extracts characteristic data of the running application program; performs matching in the scenario characteristic data set by using the extracted characteristic data of the application program; may determine corresponding application scenario information when characteristic data that is of an application program and has similarity higher than a preset threshold is matched; then, searches the preset control policy set for a corresponding power consumption control policy according to the determined application scenario information; generates a power consumption control instruction according to the power consumption control policy; and transfers the power consumption control instruction to a kernel. The kernel controls switches, frequencies, and refresh conditions of hardware modules such as an LCD, a CPU, and a GPU according to the power consumption control instruction.

Figure 7:
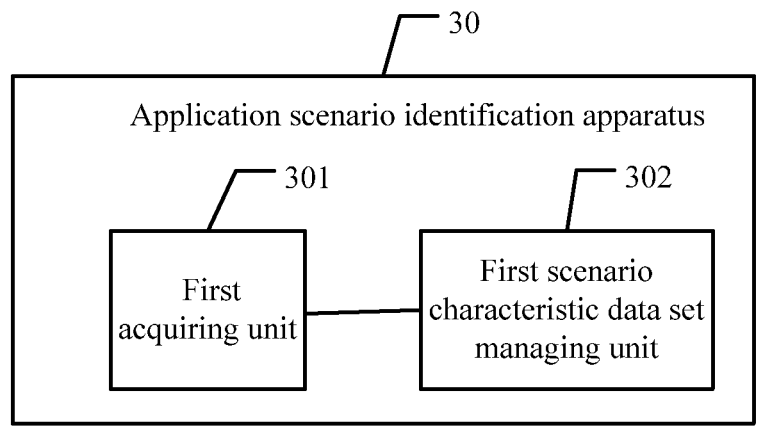
FIG. 7 is a schematic diagram of an embodiment of an application scenario identification apparatus according to an embodiment of the present disclosure.

Referring to FIG. 7, an embodiment of an application scenario identification apparatus 30 according to an embodiment of the present disclosure includes a first acquiring unit 301 configured to analyze an application program running on a terminal device by means of compilation to obtain characteristic data of the application program, and a first scenario characteristic data set managing unit 302 for configured to determine, from a scenario characteristic data set according to the characteristic data that is of the application program and is acquired by the first acquiring unit 301, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

In this embodiment of the present disclosure, a first acquiring unit 301 analyzes an application program running on a terminal device by means of compilation to obtain characteristic data of the application program; and a first scenario characteristic data set managing unit 302 determines, from a scenario characteristic data set according to the characteristic data that is of the application program and is acquired by the first acquiring unit 301, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate. Therefore, the application scenario identification apparatus provided in this embodiment of the present disclosure can relatively accurately identify an application scenario of a terminal device, thereby further improving user experience of the terminal device.

Figure 8:
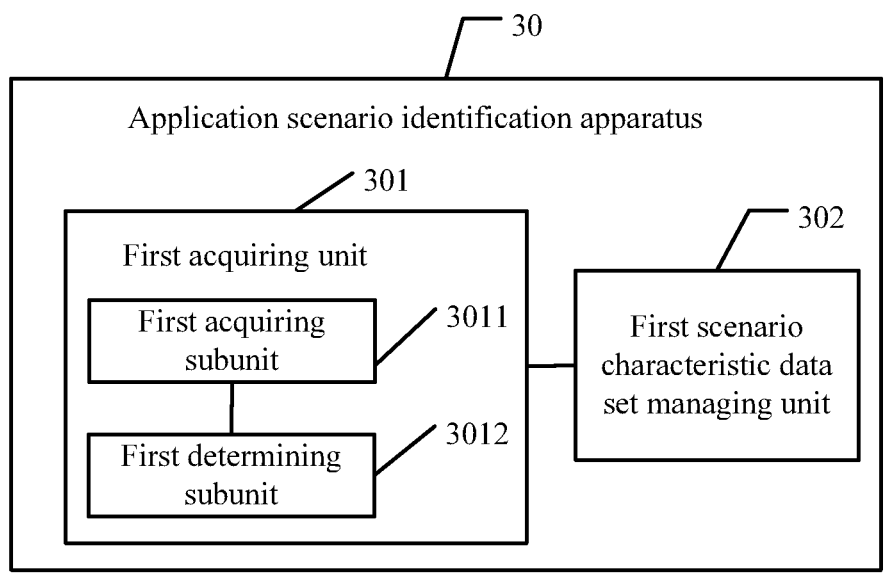
FIG. 8 is a schematic diagram of another embodiment of an application scenario identification apparatus according to an embodiment of the present disclosure.

Optionally, based on the foregoing embodiment corresponding to FIG. 7, referring to FIG. 8, in another embodiment of an application scenario identification apparatus 30 according to an embodiment of the present disclosure, the first acquiring unit 301 includes a first acquiring subunit 3011 configured to, when the application program is running, analyze the application program by means of compilation to obtain one or more functions from the application program to serve as static characteristic data, where the one or more functions are included in the application program, and are used to support normal use of one or more application functions in the application scenario currently used for the terminal device; and a first determining subunit 3012 configured to, when a frequency of invoking any function in one or more functions acquired by the first acquiring subunit

3011 exceeds a preset threshold, determine that the any function is dynamic characteristic data.

In this embodiment of the present disclosure, in some application scenarios, static characteristic data is the same but dynamic characteristic data is different; therefore, an application scenario determined by combining the static characteristic data and the dynamic characteristic data is the most accurate. A news client is used as an example, where the news client includes text news and video news. Static characteristic data of the text news and static characteristic data of the video news are all obtained from an application program of the news client; therefore, static characteristic data obtained is the same. However, a frequently invoked function of the text news may be a function A in the static characteristic data, and a frequently invoked function of the video news may be a function B in the static characteristic data, where a text news scenario may be accurately distinguished from a video news scenario according to the function A and the function B. Therefore, in this embodiment of the present disclosure, an application scenario used for a terminal device is identified by combining static characteristic data and dynamic characteristic data, which can improve an accuracy rate of identifying an application scenario used for a terminal device.

Figure 9:
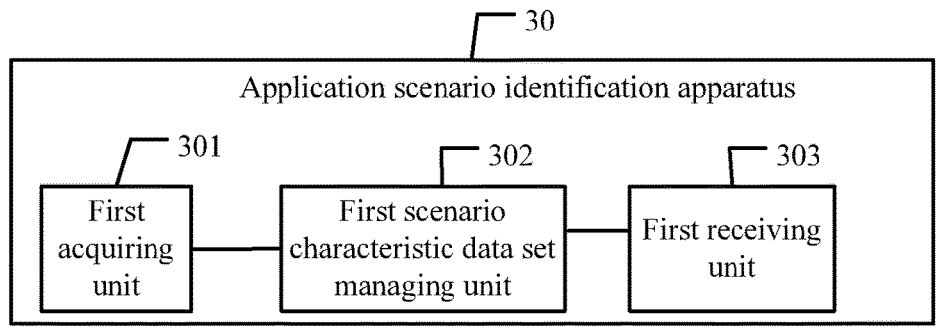
FIG. 9 is a schematic diagram of another embodiment of an application scenario identification apparatus according to an embodiment of the present disclosure.

Optionally, based on the foregoing embodiment corresponding to FIG. 7, referring to FIG. 9, in another embodiment of an application scenario identification apparatus 30 according to an embodiment of the present disclosure, the identification apparatus 30 further includes a first receiving unit 303, where the first receiving unit 303 is configured to receive application scenario information of a newly added application scenario and corresponding characteristic data of an application program, and the first scenario characteristic data set managing unit 302 is further configured to store, in the scenario characteristic data set, the application scenario information of the newly added application scenario and the corresponding characteristic data of an application program that are received by the first receiving unit 303.

Further, in this embodiment of the present disclosure, when there is a newly added application scenario, an update or an upgrade of the scenario characteristic data set can be implemented merely by storing, in the scenario characteristic data set, application scenario information of the newly added application scenario and corresponding characteristic data of an application program, which accelerates a speed of a data update or upgrade.

Optionally, based on the foregoing embodiment corresponding to FIG. 9, in another embodiment of an application scenario identification apparatus 30 according to an embodiment of the present disclosure the first receiving unit 303 is further configured to receive an instruction of deleting characteristic data of an application program of a specified application scenario and the first unit 302 for managing a scenario characteristic data set is further configured to delete, from the scenario characteristic data set according to the instruction received by the first receiving unit 303, application scenario information of the specified application scenario and corresponding characteristic data of an application program.

Further, in this embodiment of the present disclosure, when some application programs are no longer used, application scenario information and characteristic data that corresponds to the application programs may be directly deleted from the scenario characteristic data set, thereby saving memory space.

Figure 10:
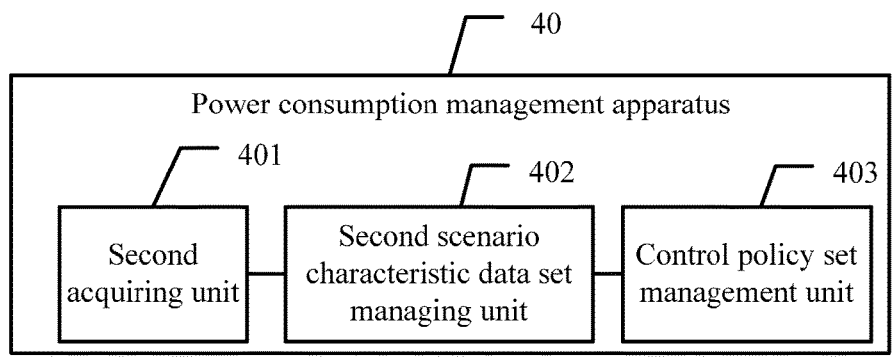
FIG. 10 is a schematic diagram of an embodiment of a power consumption management apparatus according to an embodiment of the present disclosure.

Referring to FIG. 10, an embodiment of a power consumption management apparatus 40 according to an embodiment of the present disclosure includes a second acquiring unit 401 configured to analyze an application program running on a terminal device by means of compilation to obtain characteristic data of the application program, a second scenario characteristic data set managing unit 402 configured to determine, from a scenario characteristic data set according to the characteristic data that is of the application program and is acquired by the second acquiring unit 401, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device, and a control policy set management unit 403 configured to determine, from a control policy set according to the application scenario information determined by the second scenario characteristic data set managing unit 402, a power consumption control policy corresponding to the application scenario information, where the control policy set includes a correspondence between the multiple types of application scenario information and multiple power consumption control policies.

In this embodiment of the present disclosure, a second acquiring unit 401 analyzes an application program running on a terminal device by means of compilation to obtain characteristic data of the application program; a second scenario characteristic data set managing unit 402 determines, from a scenario characteristic data set according to the characteristic data that is of the application program and is acquired by the second acquiring unit 401, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; and a control policy set management unit 403 determines, from a control policy set according to the application scenario information determined by the second scenario characteristic data set managing unit 402, a power consumption control policy corresponding to the application scenario information, where the control policy set includes a correspondence between the multiple types of application scenario information and multiple power consumption control policies. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation, and characteristic data of the application program is acquired. Because characteristic data of an application program is more likely to be unique in describing a corresponding application scenario, application scenario information corresponding to the characteristic data of the application program is relatively accurate, and further a power consumption control policy corresponding to the application scenario information is also relatively accurate. Therefore, the power consumption management apparatus provided in this embodiment of the present disclosure can relatively accurately identify an application scenario of a terminal device, so as to relatively accurately determine a power consumption control policy, thereby further improving user experience of the terminal device.

Figure 11:
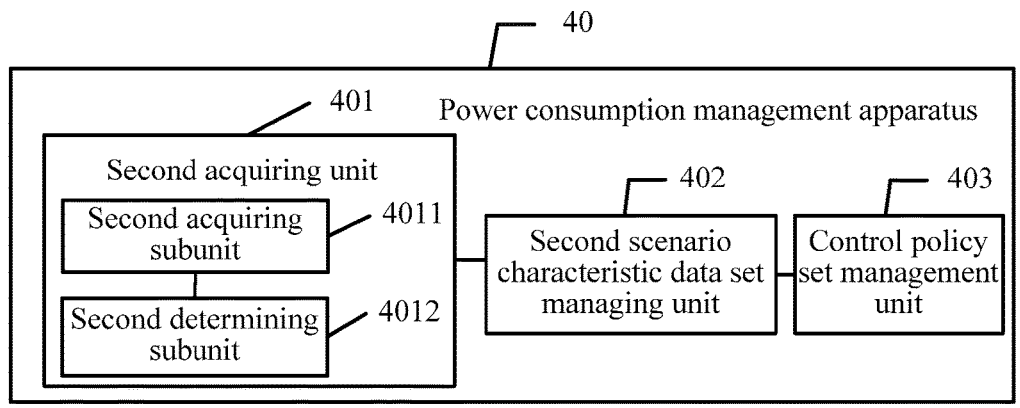
FIG. 11 is a schematic diagram of another embodiment of a power consumption management apparatus according to an embodiment of the present disclosure.

Optionally, based on the foregoing embodiment corresponding to FIG. 10, referring to FIG. 11, in another embodiment of a power consumption management apparatus 40 according to an embodiment of the present disclosure, the second acquiring unit 401 includes a second acquiring subunit 4011 configured to, when the application program is running, analyze the application program by means of compilation to obtain one or more functions from the application program to serve as static characteristic data, where the one or more functions are included in the application program, and are used to support normal use of one or more application functions in the application scenario currently used for the terminal device, and a second determining subunit 4012 configured to, when a frequency of invoking any function in one or more functions acquired by the second acquiring subunit 4011 exceeds a preset threshold, determine that the any function is dynamic characteristic data.

Further, in this embodiment of the present disclosure, in some application scenarios, static characteristic data is the same but dynamic characteristic data is different; therefore, an application scenario determined by combining the static characteristic data and the dynamic characteristic data is the most accurate. A news client is used as an example, where the news client includes text news and video news. Static characteristic data of the text news and static characteristic data of the video news are all obtained from an application program of the news client; therefore, static characteristic data obtained is the same. However, a frequently invoked function of the text news may be a function A in the static characteristic data, and a frequently invoked function of the video news may be a function B in the static characteristic data, where a text news scenario may be accurately distinguished from a video news scenario according to the function A and the function B. Therefore, in this embodiment of the present disclosure, an application scenario used for a terminal device is identified by combining static characteristic data and dynamic characteristic data, which can improve an accuracy rate of identifying an application scenario used for a terminal device.

Figure 12:
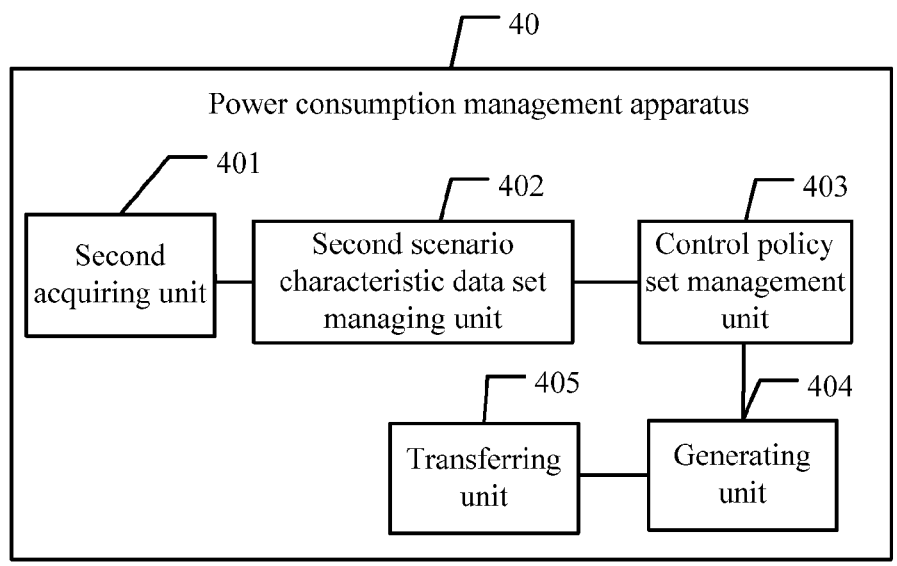
FIG. 12 is a schematic diagram of another embodiment of a power consumption management apparatus according to an embodiment of the present disclosure.

Optionally, based on the foregoing embodiment corresponding to FIG. 10, referring to FIG. 12, in another embodiment of a power consumption management apparatus 40 according to an embodiment of the present disclosure, the power consumption management apparatus 40 further includes a generating unit 404 configured to generate a corresponding power consumption control instruction according to the power consumption control policy that corresponds to the application scenario information and is determined by the control policy set management unit 403, and a transferring unit 405 configured to transfer the corresponding power consumption control instruction generated by the generating unit 404 to a kernel of the terminal device, so that power consumption control is performed by the kernel of the terminal device on corresponding hardware of the terminal device.

Figure 13:
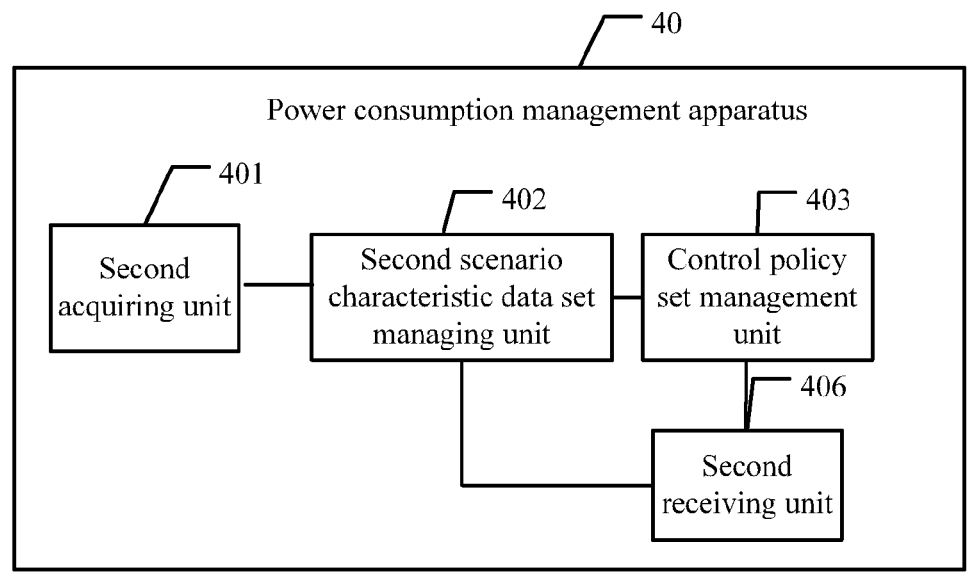
FIG. 13 is a schematic diagram of another embodiment of a power consumption management apparatus according to an embodiment of the present disclosure.

Optionally, based on the foregoing embodiment corresponding to FIG. 10, referring to FIG. 13, in another embodiment of a power consumption management apparatus 40 according to an embodiment of the present disclosure, the power consumption management apparatus 40 further includes a second receiving unit 406, where the second receiving unit 406 is configured to receive application scenario information of a newly added application scenario, corresponding characteristic data of an application program, and a corresponding power consumption control policy, the second scenario characteristic data set managing unit 402 is configured to store, in the scenario characteristic data set, the application scenario information of the newly added application scenario and the corresponding characteristic data of an application program that are received by the second receiving unit 406, and the control policy set management unit 403 is configured to store, in the control policy set, the application scenario information of the newly added application scenario and the corresponding power consumption control policy that are received by the second receiving unit 406.

Further, in this embodiment of the present disclosure, when there is a newly added application scenario, an update or an upgrade of the scenario characteristic data set can be implemented merely by storing, in the scenario characteristic data set, application scenario information of the newly added application scenario and corresponding characteristic data of an application program, which accelerates a speed of a data update or upgrade.

Optionally, based on the foregoing embodiment corresponding to FIG. 13, in another embodiment of a power consumption management apparatus 40 according to an embodiment of the present disclosure the second receiving unit 406 is further configured to receive an instruction of deleting characteristic data of an application program of a specified application scenario and a corresponding power consumption control policy, the second scenario characteristic data set managing unit 402 is further configured to delete, from the scenario characteristic data set according to the instruction received by the second receiving unit 406, application scenario information of the specified application scenario and corresponding characteristic data of an application program, and the control policy set management unit 403 is further configured to delete, from the control policy set according to the instruction received by the second receiving unit 406, the application scenario information of the specified application scenario and a corresponding power consumption control policy.

In this embodiment of the present disclosure, when some application programs are no longer used, application scenario information of a specified application scenario and corresponding characteristic data of an application program, and the application scenario information of the specified application scenario and a corresponding power consumption control policy may be respectively deleted directly from the scenario characteristic data set and the control policy set according to a deleting instruction, thereby saving memory space.

Figure 14:
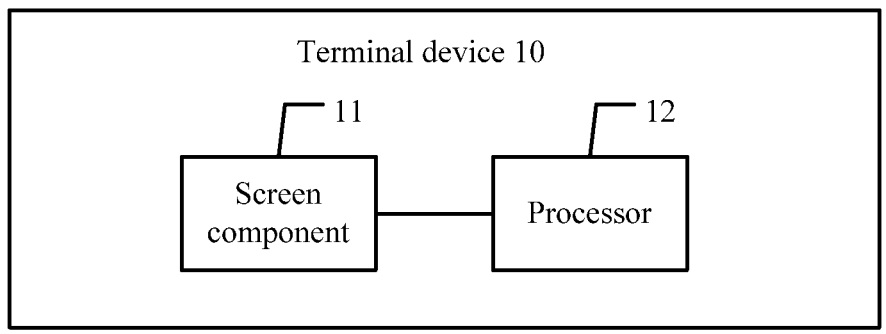
FIG. 14 is a schematic diagram of another embodiment of a terminal device according to an embodiment of the present disclosure.

Referring to FIG. 14, an embodiment of a terminal device 10 according to an embodiment of the present disclosure includes a screen component 11 and a processor 12, where the screen component 11 is configured for a user to trigger starting of an application program, and the processor 12 is configured to run the application program, where the processor 12 is further configured to: analyze the running application program by means of compilation to obtain characteristic data of the application program; and determine, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

It may be understood that, for a working mechanism of the processor 12 in this embodiment, reference may be made to the description in the foregoing method embodiments; and a function of the processor 12 may be implemented according to the methods in the foregoing method embodiments; and for a specific implementation process of the processor 12, reference may be made to relevant description of the foregoing method embodiments, and details are not described herein again.

It can be seen that, according to the terminal device in this embodiment of the present disclosure, an application program running on the terminal device is analyzed by means of compilation to obtain characteristic data of the application program; and application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate. Therefore, the terminal device provided in this embodiment of the present disclosure can relatively accurately identify an application scenario of the terminal device, thereby further improving user experience of the terminal device.

Figure 15:
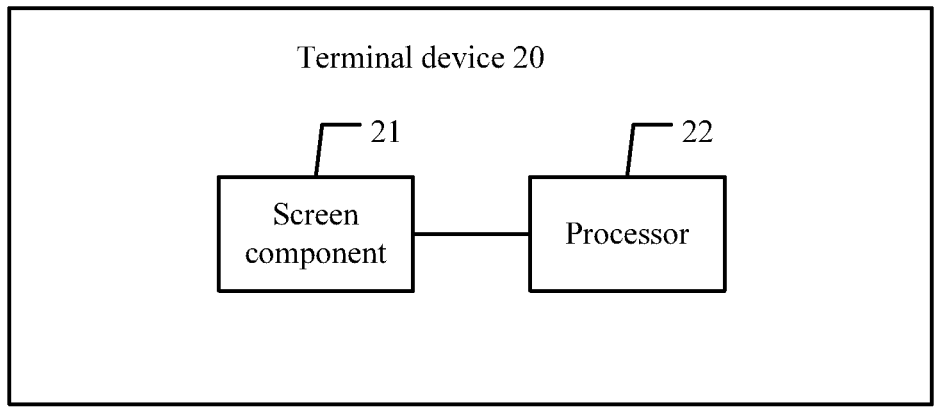
FIG. 15 is a schematic diagram of another embodiment of a terminal device according to an embodiment of the present disclosure.

Referring to FIG. 15, another embodiment of a terminal device 20 according to an embodiment of the present disclosure includes a screen component 21 and a processor 22, where the screen component 21 is configured for a user to trigger starting of an application program, and the processor 22 is configured to run the application program, where the processor 22 is further configured to: analyze the running application program by means of compilation to obtain characteristic data of the application program; determine, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; determine, from a control policy set according to the application scenario information, a power consumption control policy corresponding to the application scenario information, where the control policy set includes a correspondence between the multiple types of application scenario information and multiple power consumption control policies; and implement power consumption control on corresponding hardware of the terminal device according to the power consumption control policy corresponding to the application scenario information, where the corresponding hardware of the terminal device includes one or more of: the screen component and the processor.

It may be understood that, for a working mechanism of the processor 22 in this embodiment, reference may be made to the description in the foregoing method embodiments; and a function of the processor 22 may be implemented according to the methods in the foregoing method embodiments; and for a specific implementation process of the processor 22, reference may be made to relevant description of the foregoing method embodiments, and details are not described herein again.

It can be seen that, according to the terminal device in this embodiment of the present disclosure, an application program running on the terminal device is analyzed by means of compilation to obtain characteristic data of the application program, application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device; and a power consumption control policy corresponding to the application scenario information is determined from a control policy set according to the application scenario information, where the control policy set includes a correspondence between the multiple types of application scenario information and multiple power consumption control policies. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate, and further a power consumption control policy corresponding to the application scenario information is also relatively accurate. Therefore, the terminal device provided in this embodiment of the present disclosure can relatively accurately identify an application scenario of a terminal device, so as to relatively accurately determine a power consumption control policy, thereby further improving user experience of the terminal device.

Figure 16:
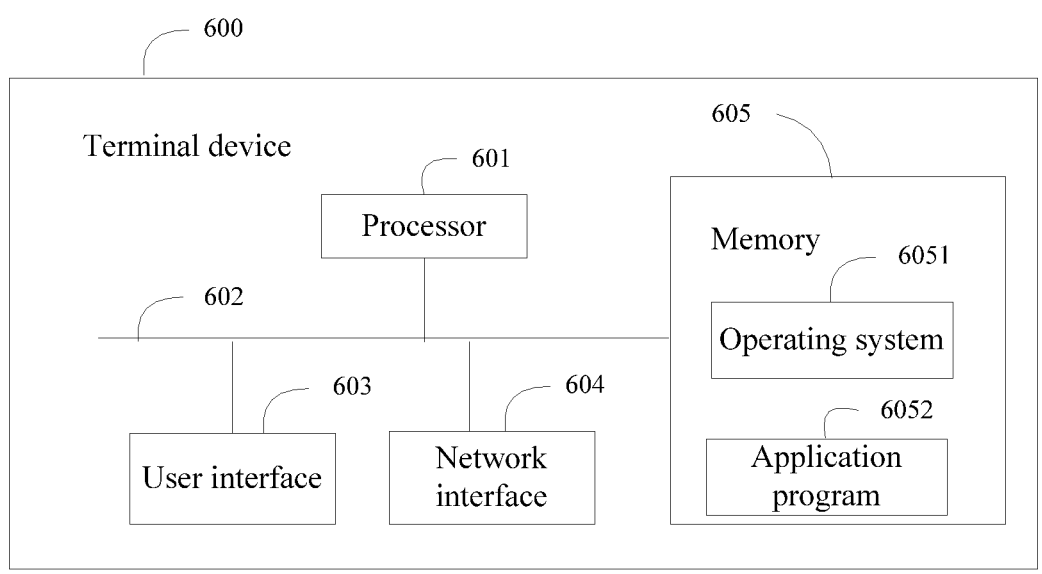
FIG. 16 is a schematic diagram of another embodiment of a terminal device according to an embodiment of the present disclosure.

FIG. 16 shows a structure of a terminal device 600 according to an embodiment of the present disclosure. The terminal device 600 includes: at least one processor 601, at least one network interface 604 or another user interface 603, a memory 605, and at least one communications bus 602. The communications bus 602 is configured to implement connection communication between these components. The user interface 603 optionally included in the terminal device 600 includes a display (for example, a touchscreen, an LCD, a CRT, a holographic, or a projector), a keyboard, or a click device (for example, a mouse, a trackball, a touch panel, or a touchscreen).

The memory 605 may include a read-only memory and a random access memory and provides an instruction and data for the processor 601, and a part of the memory 605 may further include a non-volatile random access memory (NVRAM).

In some implementation manners, the memory 605 stores the following elements: executable modules or data structures, or subsets thereof, or extended sets thereof an operating system 6051, including various system programs, for example, the framework layer (particularly, the JavaScript engine in the framework layer shown in FIG. 2), the core library layer (particularly, the virtual machine in Android Runtime shown in FIG. 1), and the drive layer that are shown in FIG. 1 or FIG. 2, which are used to implement various basic services and process a task based on hardware, and an application program module 6052, including various application programs, for example, the home screen, the media player, and the browser that are shown in FIG. 1 or FIG. 2, which are used to implement various application services.

In the terminal device 600 according to this embodiment of the present disclosure, by invoking a program or an instruction stored in the memory 605, the processor 601 is configured to analyze an application program running on a terminal device by means of compilation to obtain characteristic data of the application program, and determine, from a scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

Optionally, as an embodiment, in an aspect in which the application program running on the terminal device is analyzed by means of compilation to obtain the characteristic data of the application program, the processor 601 is configured to: when the application program is running, parse the application program, acquire one or more functions from the application program to serve as the static characteristic data, where the one or more functions are included in the application program, and are used to support normal use of one or more application functions in the application scenario currently used for the terminal device; and when a frequency of invoking any function in the one or more functions exceeds a preset threshold, determine that the any function is the dynamic characteristic data.

It can be learned that: according to the terminal device in this embodiment of the present disclosure, an application program running on the terminal device is analyzed by means of compilation to obtain characteristic data of the application program; and application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate. Therefore, the terminal device provided in this embodiment of the present disclosure can relatively accurately identify an application scenario of the terminal device, thereby further improving user experience of the terminal device.

In the terminal device 600 in this embodiment of the present disclosure, by invoking the program or the instruction stored in the memory 605, the processor 601 is further configured to determine, from a control policy set according to the application scenario information, a power consumption control policy corresponding to the application scenario information, where the control policy set includes a correspondence between the multiple types of application scenario information and multiple power consumption control policies.

Further, the processor 601 is further configured to implement power consumption control on corresponding hardware of the terminal device 600 according to the power consumption control policy corresponding to the application scenario information, where the corresponding hardware of the terminal device 600 includes one or more of: a screen component (for example, a display, a touchscreen), a processor (for example, a CPU or a GPU), and the like.

In addition, the terminal device 600 may further execute the methods in the embodiments in FIG. 3 to FIG. 6, and details are not described herein again in this embodiment of the present disclosure.

Further, the terminal device in this embodiment of the present disclosure analyzes an application program running on the terminal device by means of compilation to obtain characteristic data of the application program. Because characteristic data of an application program is more likely to be unique in describing a corresponding application scenario, application scenario information corresponding to the characteristic data of the application program is relatively accurate, and further a power consumption control policy corresponding to the application scenario information is also relatively accurate. Therefore, the terminal device 600 provided in this embodiment of the present disclosure can relatively accurately identify an application scenario of a terminal device, so as to relatively accurately determine a power consumption control policy, thereby further improving user experience of the terminal device.

Embodiments of the present disclosure further relate to a terminal device 100, an application scenario identification method, and a power consumption management method. The terminal device 100 may be a mobile phone, a tablet computer, a personal digital assistant (PDA), a point of sales (POS), a vehicle-mounted computer, or the like.

Figure 17:
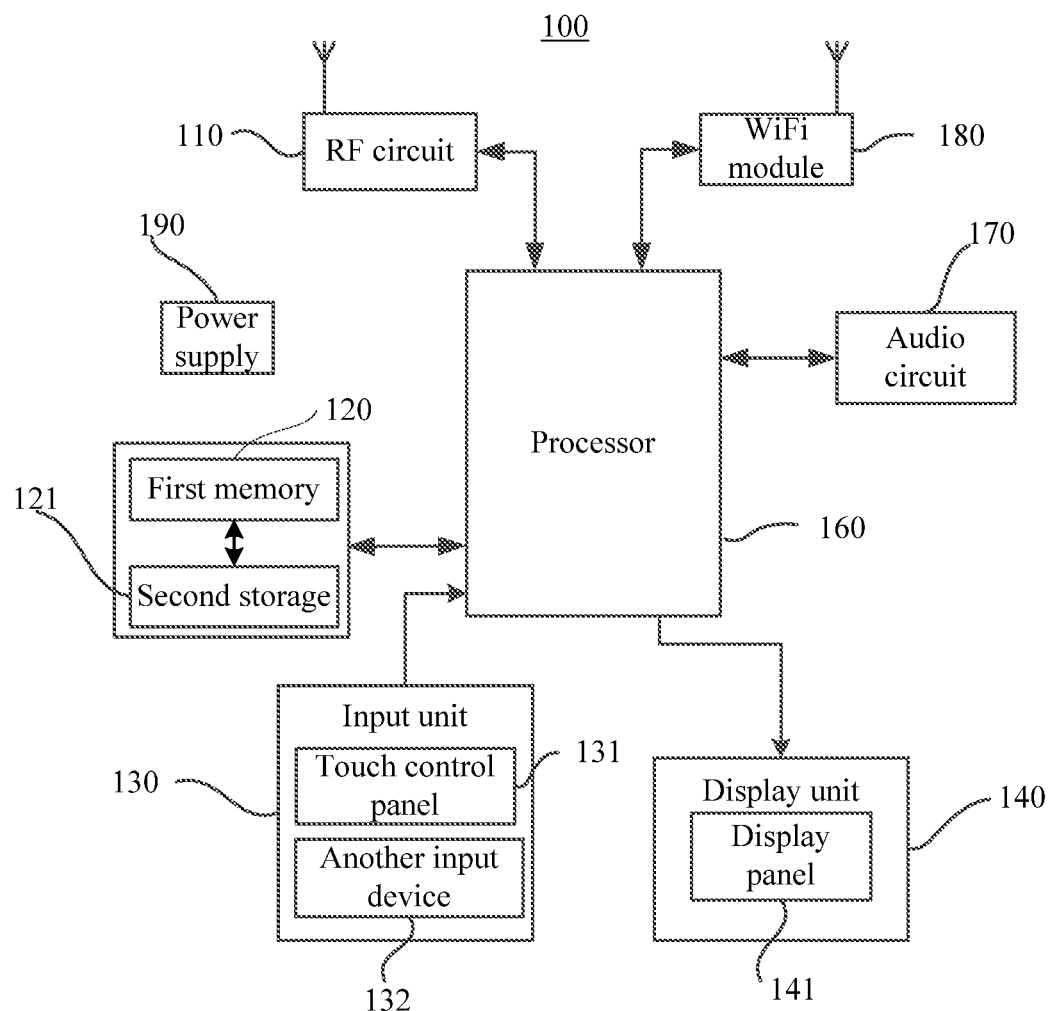
FIG. 17 is a schematic diagram of another embodiment of a terminal device according to an embodiment of the present disclosure.

FIG. 17 shows a schematic structural diagram of a terminal device 100 according to an embodiment of the present disclosure.

Referring to FIG. 17, the terminal device 100 in this embodiment of the present disclosure includes a first memory 120, a processor 160, and an input unit 130, where the first memory 120 stores a scenario characteristic data set preset by the terminal device. The scenario characteristic data set includes a correspondence between multiple types of application scenario information and characteristic data of multiple application programs, and application scenario information corresponding to characteristic data of an application program is used to indicate an application scenario currently used for the terminal device.

The input unit 130 is configured to: receive an operation of starting, by a user, an application program; and generate a starting instruction. The processor 160 is configured to: run the application program; analyze an application program running on the terminal device by means of compilation to obtain characteristic data of the application program; and determine, from the scenario characteristic data set according to the characteristic data of the application program, application scenario information corresponding to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device.

In this embodiment of the present disclosure, the terminal device 100 may further includes a second storage 121, where the second storage 121 may be configured to store a control policy set, and the control policy set includes a correspondence between the multiple types of application scenario information and multiple power consumption control policies. The processor 160 is further configured to: determine, from the control policy set according to the application scenario information, a power consumption control policy corresponding to the application scenario information; and generate a corresponding power consumption control instruction according to the power consumption control policy corresponding to the application scenario information.

It may be understood that the second storage 121 may be an external storage of the terminal device 100, and the first memory 120 may be a memory of the terminal device 100. The first memory 120 may be one of: a NVRAM, a dynamic random access memory (DRAM), a static random access memory (SRAM), a flash memory, and the like; and the second storage 121 may be a hard disk, an optical disc, a universal serial bus (USB) disk, a floppy disk, a tape drive, or the like.

The input unit 130 may be configured to receive application scenario information of a newly added application scenario, corresponding characteristic data of an application program, and a corresponding power consumption control policy. The processor 160 is further configured to: store, in the scenario characteristic data set in the first memory 120, the application scenario information of the newly added application scenario and the corresponding characteristic data of an application program; and store, in the control policy set in the second storage 121, the application scenario information of the newly added application scenario and the corresponding power consumption control policy.

The input unit 130 may be configured to receive an instruction of deleting characteristic data of an application program of a specified application scenario and a corresponding power consumption control policy.

The processor 160 is further configured to delete, from the scenario characteristic data set stored in the first memory 120, application scenario information of the specified application scenario and corresponding characteristic data of an application program.

The processor 160 is further configured to delete, from the control policy set stored in the second storage 121, the application scenario information of the specified application scenario and a corresponding power consumption control policy.

, in this embodiment of the present disclosure, the input unit 130 may include a touch control panel 131. The touch control panel 131, also referred to as a touchscreen, can collect a touch operation of the user on or near the touch control panel 131 (for example, an operation of the user on the touch control panel 131 or near the touch control panel 131 by using any proper object or accessory, such as a finger or a stylus), and drive a corresponding connection apparatus according to a preset program. Optionally, the touch control panel 131 may include two parts: a touch detection apparatus and a touch controller. The touch detection apparatus detects a touch position and direction of the user, detects a signal generated from a touch operation, and transfers the signal to the touch controller; and the touch controller receives touch information from the touch detection apparatus, converts the touch information into coordinates of a touch point, sends the coordinates of a touch point to the processor 160, and can receive and execute a command sent by the processor 160. In addition, the touch control panel 131 may be implemented by using multiple types such as a resistive type, a capacitive type, an infrared type, and a surface acoustic wave type. In addition to the touch control panel 131, the input unit 130 may further include another input device 132, where the another input device 132 may include but is not limited to one or more of: a physical keyboard, a functional button (such as a volume control button or a switch button), a trackball, a mouse, and a joystick.

The terminal device 100 may further include a display unit 140, where the display unit 140 may be configured to display information input by a user or information provided for a user and various menu interfaces of the terminal device 100. The display unit 140 may include a display panel 141, and optionally, the display panel 141 may be configured in a form of an liquid crystal display (LCD), an organic light-emitting diode (OLED), or the like.

In this embodiment of the present disclosure, the touch control panel 131 covers the display panel 141, so as to form a touch display screen 142. When the touch display screen 142 detects a touch operation on or near the touch display screen 142, the touch operation is transferred to the processor 160 to determine a type of a touch event, and afterwards, the processor 160 provides a corresponding visual output on the touch display screen 142 according to the type of the touch event.

In this embodiment of the present disclosure, the touch display screen 142 includes an application program interface display area 143 and a common control display area 144. A manner of arranging the application program interface display area 143 and the common control display area 144 is not limited, and may be an arrangement manner that can distinguish two display areas, for example, arranging up and down or arranging side by side. The application program interface display area 143 may be used to display an interface of an application program, where each interface may include at least one interface element such as an icon of an application program and/or a widget desktop control; or the application program interface display area 143 may be an empty interface that does not include any content. The common control display area 144 is used to display a control with a relatively high usage rate, for example, an icon of an application program, such as a setting button, an interface number, a scroll bar, or a phone book icon.

The processor 160 is a control center of the terminal device 100 and is connected to each part of the entire mobile phone by using various interfaces and lines, and executes various functions of the terminal device 100 and processes data by running or executing a software program and/or a module that is stored in the first memory 120 and invoking data stored in the second storage 121, so as to perform overall monitoring on the terminal device 100. Optionally, the processor 160 may include one or multiple processing units.

It can be seen that, according to the terminal device in this embodiment of the present disclosure, an application program running on the terminal device is analyzed by means of compilation to obtain characteristic data of the application program; and application scenario information corresponding to the characteristic data of the application program is determined from a scenario characteristic data set according to the characteristic data of the application program, where the scenario characteristic data set includes a correspondence between multiple types of application scenario information and characteristic data of multiple application programs, and the application scenario information corresponding to the characteristic data of the application program is used to indicate an application scenario currently used for the terminal device. Compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate. Therefore, the terminal device provided in this embodiment of the present disclosure can relatively accurately identify an application scenario of the terminal device, thereby further improving user experience of the terminal device.

Further, compared with the prior art in which an application scenario is determined by monitoring a bottom-layer event by a kernel, particularly, when multiple different upper-layer scenarios correspond to a bottom-layer event of a same series, in this embodiment of the present disclosure, an application program running on the terminal device is analyzed by means of compilation to obtain characteristic data of the application program. Because characteristic data of an application program is more likely to be unique in describing a corresponding application scenario, application scenario information corresponding to the characteristic data of the application program is relatively accurate, and further a power consumption control policy corresponding to the application scenario information is also relatively accurate. Therefore, the terminal device provided in this embodiment of the present disclosure can relatively accurately identify an application scenario of a terminal device, so as to relatively accurately determine a power consumption control policy, thereby further improving user experience of the terminal device.

A person of ordinary skill in the art may understand that all or a part of the steps of the methods in the embodiments may be implemented by a program instructing relevant hardware (such as a processor). The program may be stored in a computer readable storage medium. The storage medium may include: a ROM, a RAM, a magnetic disk, an optical disc, or the like.

The foregoing introduces in detail the application scenario identification method, the power consumption management method, the apparatus, and the terminal device that are provided in embodiments of the present disclosure. In this specification, specific examples are used to describe the principle and implementation manners of the present disclosure, and the description of the embodiments is only intended to help understand the methods and core idea of the present disclosure. Meanwhile, a person of ordinary skill in the art may, based on the idea of the present disclosure, make modifications with respect to the specific implementation manners and the application scope. In conclusion, the content of this specification shall not be construed as a limitation to the present disclosure.

What is claimed is:

1. A method for identifying an application scenario of a terminal device, wherein the method comprises:
analyzing an application program running on the terminal device for a first characteristic data of the application program; and
determining a first application scenario information corresponding to the first characteristic data based, at least in part, on a first entry in a scenario characteristic data set, wherein the scenario characteristic data set comprises a plurality of application scenario information entries each corresponding to one of a plurality of characteristic data entries, wherein each of the plurality of application scenario information entries corresponds to a different one of a plurality of application scenarios of the terminal device, wherein the characteristic data entries each comprise one or more functions of a corresponding one of a plurality of applications of the terminal device, and wherein the first application scenario information corresponding to the first characteristic data of the application program is used to indicate a current application scenario of the terminal device.

2. The method of claim 1, wherein the first characteristic data comprises a static characteristic data and a dynamic characteristic data, and wherein analyzing the application program comprises:
analyzing the application program for one or more functions of the application program, wherein the one or more functions are identified as the static characteristic data; and
determining that one or more of the one or more functions is the dynamic characteristic data when a frequency of invoking the one or more of the one or more functions exceeds a preset threshold.

3. The method of claim 1, wherein the method further comprises:
receiving additional application scenario information of a newly added application scenario and corresponding additional characteristic data of a newly added application program; and
storing the additional application scenario information and the additional characteristic data in the scenario characteristic data set.

4. The method of claim 1, wherein the method further comprises:
receiving an instruction of deleting unneeded characteristic data of an application program of a specified application scenario; and deleting, from the scenario characteristic data set, application scenario information of the specified application scenario and the unneeded characteristic data.

5. A method for managing power consumption of a terminal device, wherein the method comprises:
  analyzing an application program running on the terminal device for a first characteristic data of the application program;
  determining a first application scenario information corresponding to the first characteristic data based, at least in part, on a first entry in a scenario characteristic data set, wherein the scenario characteristic data set comprises a plurality of application scenario information entries each corresponding to one of a plurality of characteristic data entries, wherein each of the plurality of application scenario information entries corresponds to a different one of a plurality of application scenarios of the terminal device, wherein the characteristic data entries each comprise one or more functions of a corresponding one of a plurality of applications of the terminal device, and wherein the first application scenario information corresponding to the first characteristic data is used to indicate a current application scenario of the terminal device; and
  determining a first power consumption control policy corresponding to the first application scenario information based, at least in part, on a control policy set, wherein the control policy set comprises a plurality of power consumption control policies each corresponding to one of the plurality of application scenario information entries.

6. The method of claim 5, wherein the first characteristic data comprises a static characteristic data and a dynamic characteristic data, and wherein analyzing the application program comprises:
  analyzing the application program for one or more functions of the application program, wherein the one or more functions are identified as the static characteristic data; and
  determining that one or more of the one or more functions is the dynamic characteristic data when a frequency of invoking the one or more of the one or more functions exceeds a preset threshold.

7. The method of claim 5, wherein the method further comprises:
  generating a power consumption control instruction based, at least in part, on the first power consumption control policy; and
  transferring the power consumption control instruction to a kernel of the terminal device, wherein the kernel executes the power consumption control instruction on corresponding hardware of the terminal device.

8. The method of claim 5, wherein the method further comprises:
  receiving additional application scenario information of a newly added application scenario, corresponding additional characteristic data of a newly added application program, and a corresponding additional power consumption control policy of the newly added application program;
  storing the additional application scenario information and the additional characteristic data in the scenario characteristic data set; and
  storing the additional application scenario information and the additional power consumption control policy in the control policy set.

9. The method of claim 5, wherein the method further comprises:
  receiving an instruction of deleting unneeded characteristic data of an application program of a specified application scenario and a corresponding power consumption control policy;
  deleting, from the scenario characteristic data set, application scenario information of the specified application scenario and the unneeded characteristic data; and
  deleting, from the control policy set, the application scenario information of the specified application scenario and the corresponding power consumption control policy.

10. A terminal device, comprising:
  a memory; and
  a processor coupled to the memory, wherein the processor is configured to:
    run an application program;
    analyze the application program for a first characteristic data of the application program; and
    determine a first application scenario information corresponding to the first characteristic data based, at least in part, on a first entry in a scenario characteristic data set, wherein the scenario characteristic data set comprises a plurality of application scenario information entries each corresponding to one of a plurality of characteristic data entries, wherein each of the plurality of application scenario information entries corresponds to a different one of a plurality of application scenarios of the terminal device, wherein the characteristic data entries each comprise one or more functions of a corresponding one of a plurality of applications of the terminal device, and wherein the first application scenario information corresponding to the first characteristic data of the application program is used to indicate a current application scenario currently of the terminal device.

11. The terminal device of claim 10, wherein the first characteristic data comprises a static characteristic data and a dynamic characteristic data, and wherein the processor is further configured to:
  analyze the application program for one or more functions of the application program, wherein the one or more functions are identified as the static characteristic data; and
  determine that one or more of the one or more functions is the dynamic characteristic data when a frequency of invoking the one or more of the one or more functions exceeds a preset threshold.

12. The terminal device of claim 10, wherein the processor is further configured to:
  receive additional application scenario information of a newly added application scenario and corresponding additional characteristic data of a newly added application program; and
  store, in the scenario characteristic data set, the additional application scenario information and the additional characteristic data.

13. The terminal device of claim 12, wherein the processor is further configured to:
  receive an instruction of deleting unneeded characteristic data of an application program of a specified application scenario; and
  delete, from the scenario characteristic data set according to the instruction, application scenario information of the specified application scenario and the unneeded characteristic data.

14. A terminal device, comprising:
a memory; and
a processor coupled to the memory, wherein the processor is configured to:
  run an application program;
  analyze the application program for a first characteristic data of the application program;
  determine a first application scenario information corresponding to the first characteristic data of the application program based, at least in part, on a scenario characteristic data set, wherein the scenario characteristic data set comprises a plurality of application scenario information entries each corresponding to one of a plurality of characteristic data entries, wherein each of the plurality of application scenario information entries corresponds to a different one of a plurality of application scenarios of the terminal device, wherein the characteristic data entries each comprise one or more functions of a corresponding one of a plurality of applications of the terminal device, and wherein the first application scenario information corresponding to the first characteristic data is used to indicate a current application scenario of the terminal device;
  determine a first power consumption control policy corresponding to the first application scenario information based, at least in part, on a control policy set, wherein the control policy set comprises a plurality of power consumption control policies each corresponding to one of the plurality of application scenario information entries; and
  implement power consumption control on corresponding hardware of the terminal device based, at least in part, on the first power consumption control policy.

15. The terminal device of claim 14, wherein the first characteristic data comprises a static characteristic data and a dynamic characteristic data, and wherein the processor is further configured to:
  analyze the application program for one or more functions of the application program, wherein the one or more functions are identified as the static characteristic data; and
  determine that one or more of the one or more functions is the dynamic characteristic data when a frequency of invoking the one or more of the one or more functions exceeds a preset threshold.

16. The terminal device of claim 14, wherein the processor is further configured to:
  generate a power consumption control instruction based, at least in part, on the first power consumption control policy; and
  transfer the power consumption control instruction to a kernel of the terminal device, wherein the kernel executes the power consumption control instruction on corresponding hardware of the terminal device.

17. The terminal device of claim 14, wherein the processor is further configured to:
  receive additional application scenario information of a newly added application scenario, corresponding additional characteristic data of a newly added application program, and a corresponding additional power consumption control policy;
  store, in the scenario characteristic data set, the additional application scenario information and the additional characteristic data; and
  store, in the control policy set, the additional application scenario information and the additional power consumption control policy.

18. The terminal device of claim 17, wherein the processor is further configured to:
  receive an instruction of deleting unneeded characteristic data of an application program of a specified application scenario and a corresponding unneeded power consumption control policy;
  delete, from the scenario characteristic data set, application scenario information of the specified application scenario and the unneeded characteristic data; and
  delete, from the control policy set according to the instruction, the application scenario information of the specified application scenario and the unneeded power consumption control policy.

* * * * *